United States Patent
Shor et al.

(10) Patent No.: US 9,979,600 B2
(45) Date of Patent: May 22, 2018

(54) SYSTEM AND METHOD FOR AUTOMATIC LOAD ADAPTIVE ANTENNA CARRIER BANDWIDTH DYNAMIC RECONFIGURATION IN RADIO BASE STATION SYSTEM

(71) Applicant: FREESCALE SEMICONDUCTOR, INC., Austin, TX (US)

(72) Inventors: Roi Menahem Shor, Tel-Aviv (IL); Avraham Horn, Givat Shmuel (IL); Shay Shpritz, Hod Ha Sharon (IL)

(73) Assignee: NXP USA, Inc., Austin, TX (US)

( * ) Notice: Subject to any disclaimer, the term of this patent is extended or adjusted under 35 U.S.C. 154(b) by 0 days. days.

(21) Appl. No.: 14/969,581

(22) Filed: Dec. 15, 2015

(65) Prior Publication Data

US 2017/0171088 A1    Jun. 15, 2017

(51) Int. Cl.
*H04L 12/801* (2013.01)
*H04L 12/24* (2006.01)
(Continued)

(52) U.S. Cl.
CPC .......... *H04L 41/0896* (2013.01); *H04L 47/25* (2013.01); *H04L 47/29* (2013.01); *H04L 47/30* (2013.01)

(58) Field of Classification Search
CPC ..... H04L 47/18; H04L 41/0896; H04L 47/30; H04W 88/10
See application file for complete search history.

(56) References Cited

U.S. PATENT DOCUMENTS 6,212,169 B1   4/2001  Bawa et al.
7,099,969 B2   8/2006  McAfee et al.
(Continued)

FOREIGN PATENT DOCUMENTS

CN      101082894 A    12/2007
WO   WO-2017077361 A1   5/2017

OTHER PUBLICATIONS

Ericsson Ab, et al., "CPRI Specification V6.1: Common Public Radio Interface (CPRI) Interface Specification," Section 2 (System Description, pp. 5-10) and Section 4.5 (Start-Up Sequence, pp. 62-70); Jul. 1, 2014; 129 pages.
(Continued)

*Primary Examiner* — Melvin Marcelo

(57) ABSTRACT

A method performed by a radio base station, the method including determining that one of a Direct Memory Access (DMA) buffers of a communication link for a service provider has gone beyond a DMA buffer limit (empty or full), the communication link between a radio equipment control (REC) device and a radio equipment (RE) device that is operating based on a first bandwidth configuration of the communication link. The method further including in response to determining that the communication link is to change operation (due to reaching the DMA buffer limit) based on a second bandwidth configuration of the communication link, instead of the first bandwidth configuration, continuing operation of the communication link based on the second bandwidth configuration. The method further including that after going back under the DMA buffer limit, the communication link continuing operation based on the original first bandwidth configuration.

20 Claims, 6 Drawing Sheets

(51) Int. Cl.
*H04W 88/10* (2009.01)
*H04L 12/835* (2013.01)
*H04L 12/825* (2013.01)

(56) References Cited

U.S. PATENT DOCUMENTS

| | | | |
|---|---|---|---|
| 7,460,513 | B2 | 12/2008 | Osterling |
| 7,924,054 | B1 | 4/2011 | Doubler et al. |
| 7,940,667 | B1 | 5/2011 | Coady et al. |
| 8,050,296 | B2 | 11/2011 | Osterling |
| 8,171,121 | B2 | 5/2012 | Ayyar et al. |
| 8,295,294 | B2 | 10/2012 | Kerr et al. |
| 8,443,126 | B2 | 5/2013 | Elboim |
| 8,599,827 | B2 | 12/2013 | Irvine |
| 8,649,388 | B2 | 2/2014 | Evan et al. |
| 8,908,650 | B2 | 12/2014 | Aarflot et al. |
| 9,036,544 | B2 | 5/2015 | Johansson et al. |
| 9,282,476 | B2 | 3/2016 | Fujita |
| 9,635,710 | B2 | 4/2017 | Shor et al. |
| 2004/0218565 | A1* | 11/2004 | Davis .............. H04L 47/10 370/331 |
| 2005/0259616 | A1* | 11/2005 | Major .............. H04L 47/14 370/329 |
| 2008/0171569 | A1 | 7/2008 | Pralle et al. |
| 2008/0225816 | A1 | 9/2008 | Osterling et al. |
| 2010/0291955 | A1 | 11/2010 | Sattele |
| 2012/0250520 | A1 | 10/2012 | Chen et al. |
| 2014/0289781 | A1* | 9/2014 | Frydman .......... H04N 21/23805 725/62 |
| 2017/0064661 | A1 | 3/2017 | Katagiri et al. |
| 2017/0070440 | A1* | 3/2017 | Hardt .............. H04L 47/30 |

OTHER PUBLICATIONS

Non-Final Office Action dated Sep. 14, 2017 for U.S. Appl. No. 14/987,072.
U.S. Appl. No. 14/824,684, filed Aug. 12, 2015, entitled "System and Method for Radio Base Station Device Hot Switching and Hot Swapping".
U.S. Appl. No. 14/824,768, filed Aug. 12, 2015, entitled "System and Method for Radio Base Station Device Hot Reconnection (Hot Plugging)".
U.S. Appl. No. 14/969,879, filed Dec. 15, 2015, entitled "System and Method for On-The-Fly Modification of the Properties on an Active Antenna Carrier in Radio Base Station Communication Operation".
U.S. Appl. No. 14/987,072, filed Jan. 14, 2016, entitled "System and Method for Automatic Delay Compensation in a Radio Base Station System".
U.S. Appl. No. 14/824,684, "System and Method for Radio Base Station Device Hot Switching and Hot Swapping", filed Aug. 12, 2015, Office Action—Non Final Rejection, dated Dec. 14, 2017.
Final Rejection Office Action dated Jan. 9, 2018 for U.S. Appl. No. 14/987,072, 27 pages.
Non-Final Office Action dated Feb. 22, 2018 for U.S. Appl. No. 14/969,879, 23 pages.
Non-Final Office Action dated Mar. 8, 2018 for U.S. Appl. No. 14/824,768, 32 pages.

* cited by examiner

SYSTEM AND METHOD FOR AUTOMATIC LOAD ADAPTIVE ANTENNA CARRIER BANDWIDTH DYNAMIC RECONFIGURATION IN RADIO BASE STATION SYSTEM

CROSS-REFERENCE TO RELATED APPLICATION(S)

The present application is related to co-pending U.S. patent application Ser. No. 14/969,879, entitled "SYSTEM AND METHOD FOR ON-THE-FLY MODIFICATION OF THE PROPERTIES ON AN ACTIVE ANTENNA CARRIER IN RADIO BASE STATION COMMUNICATION OPERATION," filed on Dec. 15, 2015.

FIELD OF THE DISCLOSURE

This disclosure generally relates to radio based communications, and more particularly to a radio base station system.

BACKGROUND

Radio base station systems (RBSs) operate to provide communication for one or more wireless user equipment units over one or more radio access networks of a cellular communication system. A radio access network is used by service providers to establish one or more point-to-point communication paths, e.g., such as a communication between two smart phones, a smart phone and a data server, and the like. An RBS has one or more radio equipment control (REC) devices, one or more radio equipment (RE) devices connected to one or more antennas that are used to facilitate the point-to-point communication paths defined by the service providers. The REC devices operate to communicate with the radio access networks via a network interface and the RE devices operate in conjunction with the antennas to communicate with the wireless user equipment units, such as smart phones, via an air interface which transmits and receives signals over the one or more antennas. The REC and RE devices operate with each other via the one or more interface links. The point-to-point information that is transmitted is streaming information based upon a particular streaming protocol, wherein a streaming protocol is a continuous stream of information that cannot be put on hold and has no re-transmission capabilities and, as such the interface links need to be operational for all communication to keep data from being dropped.

A typical RBS has a REC connected to a RE via an interface link having properties that are defined during a negotiation process. The properties are based upon the requests of one or more service providers. For example, a particular interface link can communicate information for multiple service providers, such as ATT, Sprint, and the like, and the amount of data, e.g., the data rate, the link communicates for each service provider, and the allocation and quality of each service provider's bandwidth, with respect to individual point-to-point communications generally referred to as antenna carriers in the CPRI specification, is defined by the service provider. During operation of the RBS, antenna carrier information to be processed and transmitted in various antenna carriers over the interface link is received by the REC from a network interface. After processing the received information, it is stored by the REC in a transmit buffer before being transmitted to the RE over the interface link. Similarly, antenna carrier information from the RE is received by the REC at the interface link, and is stored by the REC in a receive buffer before additional processing and transmission over the network interface.

In certain circumstances, such as when a temporary high load on system busses of the REC hinder processing of information, a data under-run can occur in the transmit buffer that holds data for a specific antenna carrier prior to transmission over the interface link; and a data over-run can occur in the receive buffer that holds data for a specific antenna carrier prior to transmission over the network interface. Because the RBS has no way of identifying original good data from the harmed data, data corruption occurs. In order to return to normal operation after an over-run or under-run scenario, where the data transmitted over the link is received without a data violation (e.g. the received data being overwritten) in a synchronous way, a reconfiguration of the link is required. The communication of streaming information over the link must be stopped in order to reconfigure the link and the communication can only be restarted after the reconfiguration process has completed and at a specific communication data synchronization point. Such result in meaningful down time resulting in the loss of streaming data, and impacting the quality of service of the RBS.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
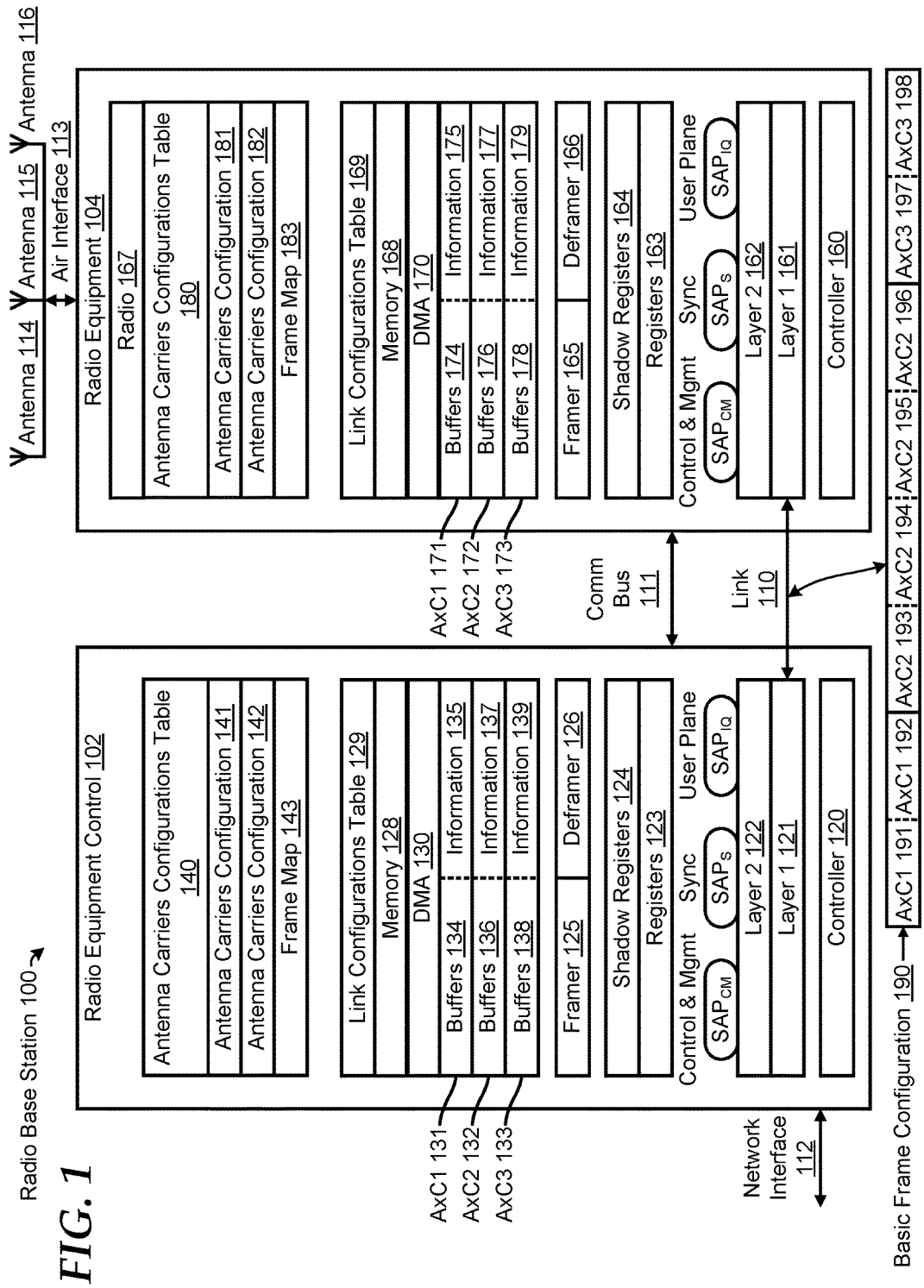
FIG. 1 is a block diagram illustrating a radio base station system including a radio equipment control device having a controller that performs automatic load adaptive dynamic reconfiguration of an active antenna carrier's communication bandwidth over an interface link in operation, in accordance with at least one embodiment of the present disclosure.

An embodiment of a radio base station system (RBS) is disclosed that includes a radio equipment control (REC) device having a Direct Memory Access (DMA) module, a radio equipment (RE) device having a DMA module, one or more antennas, and an interface link connected to the REC and the RE. During an initial configuration process of the interface link, a handshake process, referred to as an auto-negotiation, occurs between the REC and the RE to establish an initial link configuration based upon service provider requirements that is utilized by the REC and the RE to transmit frames containing streaming data over the interface link. The initial link configuration includes data rate information that for each antenna carrier that is mapped to a frame communicated over the interface link. For example, the initial link configuration can include bandwidth and data width information for each antenna carrier. Thus, for a particular antenna carrier, the link configuration will include information identifying a particular bandwidth and data width at which the particular antenna carrier is transmitted at consecutive data frame instances. Note that for ease of discussion, changing the data rate of a specific antenna carrier is usually described in reference to changing its bandwidth, e.g., the number of antenna carrier samples transmitted in a frame. It will be appreciated, however, that the data rate of a specific antenna carrier can also be changed by changing the data width of its transmitted samples.

When the REC determines that a transmit DMA buffer threshold value associated with a specific antenna carrier has been met that indicates the transmit DMA buffer has less data than desired, the REC can decide that the link configuration is to change. For example the bandwidth of the specific antenna carrier can be lowered so that streaming data of the specific antenna carrier is transmitted at a lower data rate. Because a lower antenna carrier bandwidth will result in less data being transmitted for the specific antenna carrier over each frame, by virtue of using fewer antenna carrier samples of the frame, the amount of data stored at the transmit DMA buffer can begin to return to within a desired level, e.g., the amount of stored data increases. Information relating to the change of bandwidth for the particular antenna carrier is provided to the RE from the REC in advance of the change so that the RE can also prepare to receive frames for the particular antenna carrier based on the lower bandwidth configuration. In addition, timing information is also provided to the RE by the REC that indicates the frame at which when the change is to occur. As such, the RE and REC continue to communicate frames based on the original bandwidth and data width while preparing to receive frames for the antenna carriers new bandwidth. In this manner, the REC mitigates or eliminates a data under-run at the transmit buffer, and the interface link between the REC and the RE can be reconfigured without downtime, which is associated with the typical auto-negotiation process that establishes the initial interface link. Thus, streaming data is not lost. Various embodiments of the present disclosure will be better understood with reference to the attached Figures.

FIG. 1 illustrates a radio base station system (RBS) 100 that performs automatic load adaptive dynamic reconfiguration of the data rate of an active antenna carrier's communication over an interface link in operation. The data rate of an antenna carrier's communication can be affected by one or more characteristics, such as the bandwidth of the antenna carrier, which is number of samples that are allocated to the antenna carrier in a frame, and the sample width, which is the amount of data in each antenna carrier sample. By way of example, it is presumed herein that the bandwidth of an antenna carrier is being changed, though the same techniques and features can be used to change the data width of antenna carriers.

RBS 100 includes a radio equipment control (REC) device 102 and a radio equipment (RE) device 104. REC 102 provides the radio functions of the digital baseband domain including the radio access network interface transport, transmit/receive of information between REC 102 and RE 104, the radio base station control and management, and the digital baseband processing. RE 104 provides the analogue and radio frequency functions including filtering, modulation, frequency conversion, and amplification. In an embodiment, RBS 100 includes a chain of REC devices coupled to a chain of RE devices.

REC 102 communicates with one or more radio access networks of a cellular communications system (not illustrated) via a radio access network interface 112. Information over radio access network interface 112 is provided by one or more service providers, also referred herein as carriers and network carriers. RE 104 communicates with one or more wireless user equipment units (not shown) via an air interface 113 which transmits and receives signals over one or more antennas 114, 115, and 116. Examples of a wireless user equipment unit are mobile stations such as a mobile telephone, a wearable device such as a smart watch, a wireless robot, a laptop with mobile termination, an automobile telephone, a fixed wireless device, and the like, which can communicate voice, video, data, programs/program instructions, and the like with a radio access network.

REC 102 communicates with RE 104 via a communications link 110 and a communication bus 111. Link 110 is a point-to-point interface that provides a digital connection between REC 102 and RE 104. Link 110 may be a Common Public Radio Interface (CPRI) link as described in the Common Public Interface Specification, referred herein as the CPRI specification, an Open Base Station Architecture Initiative (OBSAI) interface link as described in the Open Base Station Architecture Initiative BTS System Reference Document, and the like. Link 110 may communicate using Ethernet protocol, High-level Data Link Control (HDLC) protocol, Layer 1 In band (L1 In band) protocol, and the like. Communication bus 111 may be an Ethernet bus, a Peripheral Component Interface (PCI) Express bus, and the like, and may operate outside link 110 utilizing a different communication protocol than link 110. Communication bus 111 can be used to support other communications between the RE, REC, and other devices as needed or desired.

RBS 100 can support a plurality of radio access networks such as an Universal Mobile Telecommunications System (UMTS) network, an evolved UMTS Terrestrial Radio Access (E_UTRA) network, a Worldwide Interoperability for Microwave Access (WiMAX) network, a Global System for Mobile (GSM) network, a Code Division Multiple Access (CDMA) network, a wideband CDMA network, a Time Division Multiple Access (TDMA) network, a Long Term Evolution (LTE) network, a Long Term Evolution Advanced (LTE-A) network, and the like, as appropriate for the application.

REC 102 includes a controller 120, a layer 1 interface 121 connected to link 110, a layer 2 interface 122, a service access point ($SAP_{CM}$) for control and management, a service access point (SAPs) for synchronization, a service access point (IQ) data ($SAP_{IQ}$) for In-Phase and Quadrature, registers 123, shadow registers 124, a framer 125, a deframer 126, a direct memory access (DMA) 130, a memory 128, a link configurations table 129, and an antenna carrier configurations table 140.

Controller 120 performs a configuration process to implement a first link configuration based on a set of information, referred to herein as an "antenna carriers configuration entry" that stores various configuration information for each antenna carrier. During an initialization process, a specific antenna carriers configuration entry can be utilized by REC 102 and RE 104 to establish a communication over link 110. As will be discussed in greater detail below, the antenna carriers configuration entry used to configure the link 110 is based upon requirements provided by one or more service providers. For example, a first service provider may want the link to support a given number of antenna carriers, e.g., point-to-point communications, at a certain quality level, e.g., bandwidth, and a second service provide may want to support a different number of antenna carriers at the same or a different quality level.

Registers 123 are configured by controller 120 to implement the first link configuration. Controller 120 may also perform a reconfiguration process to implement a different link configuration based upon a different antenna carriers configuration entry, which, for example, can change the bandwidth of one or more antenna carriers. In response to the fullness/emptiness of a DMA buffer of RBS 100 meeting a threshold value, as described in further detail below, controller 120 can perform the reconfiguration process that changes an antenna carrier's bandwidth. During the reconfiguration process, shadow registers 124 are configured by controller 120 with information from a different antenna carriers configuration entry in advance of the change. The entries of shadow registers 124 correspond to some or all of registers 123. Controller 120 configures registers 123 from the entries of shadow registers 124 concurrently with a controller of the RE to concurrently implement link configuration changes, which will be described in greater detail herein.

Link configurations table 129 includes information identifying various configurations of link 110 that are capable of being supported by REC 102. During an auto-negotiation process as described in the CPRI specification, controller 120 of REC 102 utilizes the information in link configurations table 129 to identify various link configurations that are supported by both REC 102 and RE 104. In particular, link configurations table 129 may include a link total available bit rate of the interface link, a link protocol of the interface link, a seed that is used for scrambling data sent over the link, and the control and management link characteristics having a fast/slow control and management link bit rate of the interface. In an embodiment, scrambling the data is utilized when high link bit rates of the interface are used. In an embodiment, controller 120 configures link configurations table 129 during a configuration process prior to bringing link 110 into operation. For example, according to an embodiment, controller 120 configures link configurations table 129 during a reset, a restart, an initialization, an update process, and the like.

Antenna carrier configurations table 140 includes a frame map configuration entry 143 that includes information for each antenna carrier of a particular link configuration that indicates its starting location with a frame transmitted and received over link 110. Antenna carrier configurations table 140 also includes a plurality of antenna carriers configuration entries, each of which includes each antenna carrier's unique information, such as the bandwidth of each antenna carrier. It will be appreciated that antenna carrier configurations entries of table 140 can also include data width configuration entries (not shown for ease of illustration) that have similar characteristics, and that operate in the same manner as the antenna carriers configuration entries to change the data width of an antenna carrier's samples.

As shown, antenna carrier configurations table 140 includes entries for two antenna carriers configurations 141 and 142. One of these antenna carriers configuration entries can correspond to the current link configuration, and the other to a previous, or next, link configuration. By way of example, it is presumed each of antenna carriers configuration 141 and 142 are for a common mapping of antenna carriers as indicated in frame map configuration entry 143. By way of example, it is presumed controller 120 stored antenna carrier configurations entry 141 at table 140 during an initialization process, and that entry 141 was used during an initialization process that configured initial operation of link 110. Controller 120 can dynamically configure and add additional antenna carriers configuration entries during operation of link 110, e.g., antenna carriers configuration entry 142, to be used during subsequent changes in configuration.

Three different information flows (protocol data planes) are multiplexed over link 110 including data flows of user plane data, control and management plane data, and synchronization plane data. The control plane (control data flow) is used for point-to-point communication processing; the management plane (management data flow) data is management information for the operation, administration and maintenance of link 110, REC 102, and RE 104; the user plane (user data flow) data (IQ data) includes antenna carrier data that has to be transferred from RBS 100 to the user equipment devices, e.g., a mobile phone user, and visa versa, and the synchronization data flow transfers synchronization and timing information between REC 102 and RE 104. In addition to the user plane data, control and management (C&M) control signals as well as synchronization control signals are exchanged between REC 102 and RE 104. All information flows or "planes", including both control and user data, are multiplexed onto link 110 using layer 1 interface 121 and layer 2 interface 122 protocols via the appropriate service access points (SAP-S).

Layer 1 interface 121 is a physical layer interface that performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 122 is a data link layer that provides flexibility and scalability for providing different layer 2 protocols. For example, the data link layer may implement a High-level Data Link Control (HDLC) slow control and management channel, an Ethernet fast control and management channel, and a vendor specific (VSS) control and management channel. Layer 2 interface 122 may further provide media access control, flow control, and data protection of the control and management information flow over link 110 via REC 102. Layer 2 service access points (SAP-S) are defined for the information planes or data flows and are denoted as $SAP_{CM}$, $SAP_S$, and $SAP_{IQ}$ of REC 102. $SAP_{CM}$, $SAP_S$, and SAN are defined on a per link basis, where for a given link, $SAP_{CM}$ is mapped to receive an information flow of control plane data and management plane data for that link, $SAP_S$ is mapped to an information flow of synchronization plane data for that link, and $SAP_{IQ}$ is mapped to an information flow of user plane data based on IQ complex data for that link.

REC 102 can also communicate control, management, and synchronization information to RE 104 via communication bus 111 utilizing protocols of communication bus 111, outside of link 110. Similarly, REC 102 may also receive information from RE 104 via communication bus 111.

REC 102 and RE 104 may communicate user plane data over link 110 as frames of data, where each frame has a basic frame configuration. Each frame contains data of one or more antennas at locations within each frame based on mapping and bandwidth information, such as is stored at a frame mapping configuration entry and at an antenna carriers configuration entry of the antenna carrier configurations table 140. A frame is also referred herein as a basic frame, and its frame configuration can be referred herein as a basic frame configuration, and can have the basic frame structure as described in the CPRI specification. In an embodiment, a radio frame is transmitted over link 110 that include a specified number of hyper frames, where a hyper frame includes a specified number of frames. For example, a radio frame includes 150 hyper frames and each hyper frame includes 256 basic frames, as described in the CPRI specification. It will be appreciated that the number of hyper frames included in a radio frame can be any number greater than or equal to zero, the number of frames included in a radio frame can be any number greater than or equal to one, and the number of frames included in a hyper frame can be any number greater than or equal to one. As such, a radio frame can include only frames, or can include a hierarchy of hyper frames and frames.

An exemplary basic frame configuration 190 is shown that is configured to transmit three antenna carriers in a streaming manner over a sequence of frames. As illustrated, frame configuration 190 has a total of eight sample locations, referred to as antenna carrier samples, each of which can transmit an agreed upon amount of data on behalf of one antenna carrier. The three antenna carriers of frame 190 are labelled AxC1, AxC2, and AxC3, wherein AxC1 includes two antenna carrier samples 191-192, AxC2 includes four antenna carrier samples 193-196, and AxC3 includes two antenna carrier samples 197-198. The data rate of particular antenna carrier of frame configuration 190 is based the number of antenna carrier samples of a basic frame that are allocated to transmitting data on behalf of that antenna carrier. Thus, assuming a fixed sample width for each antenna carrier, the data rate of AxC2 is twice the data rate of AxC1 and AxC3 by virtue of twice as many data samples being dedicated to AxC2.

The actual data rate of a particular antenna carrier is also based upon the data rate at which link 110 operates, which can be agreed upon by RE 104 and REC 102 during configuration. By way of example, it is presumed herein that an antenna carrier having four samples in its basic frame has a 10 Mhz LTE bandwidth over link 110, e.g., a particular data rate, while an antenna carrier having two samples in a frame has a 5 MHz LTE bandwidth. It will be appreciated, that the data width of a giving antenna sample can affect the data rate of an antenna carrier as well.

Registers 123 includes all of the operating registers of REC 102 including link 110 configuration and status registers. Controller 120 configures registers 123 during an auto-negotiation and initializes registers 123 to enable communication between REC 102 and RE 104 and to operate link 110 based on an antenna carriers configuration entry stored at the antenna carrier configurations table 140. Registers 123 include transmit/receive antenna carriers control registers, such as, for example: registers that indicate the state of each antenna carrier, where the state of the antenna carrier may be an active state or an inactive state; DMA transmit/receive control registers that indicate source and destination addresses; transmit/receive sample width and number of antenna carriers registers, and mapping information that indicates how data associated with the active antenna carriers' data is mapped within a frame, e.g., frame map 143. In an embodiment, registers 123 may support a CPRI having CPRI transmit/receive antenna carrier control registers, CPRI DMA transmit/receive control registers, CPRI transmit/receive status registers, CPRI transmit/receive sample width and number of antenna carriers registers, and CPRI frame number registers.

Framer 125 multiplexes multiple data for multiple antenna carriers into frames for transmission over link 110 to RE 104 based on a mapping and antenna carriers configuration, such as, for example, antenna carriers configuration 141. Note, that the framer actively uses information stored at register 123 that was obtained from antenna carriers configuration entry 141.

Frames received by the REC 102 from RE 104 are provided to a deframer 126, which de-multiplexes the antenna carrier information based upon the basic frame configuration 190, as well as other data flow, control and management, and layer 1 interface 121 timing and maintenance information from the frame based on an antenna carriers configuration entry, such as, for example, antenna carriers configuration 141, and distributes to the appropriate SAP.

DMA 130 can include a plurality of sets of buffers and associated information; each set of buffers of the plurality, and associated information, is associated with a particular antenna carrier and can be allocated by controller 120 during a configuration process. As shown, DMA 130 includes three sets of buffers 134, 136, 138 and associated information, 135, 137, 139, which can correspond to antenna carriers AxC1, AxC2, and AxC3, respectively. Each set of buffers 134, 136, and 138 include a receive buffer and a transmit buffer that allows the bidirectional transfer of data over link 110 in an efficient manner. As an example, buffers 134 are for antenna carrier AxC1 131, buffers 136 are for antenna carrier AxC2 132, and buffers 138 are antenna carrier AxC3 133. It is further presumed that antenna carrier AxC1 transmits at antenna 114, antenna carrier AxC2 transmits at antenna 115, and antenna carrier AxC3 transmits at antenna 116. It is also presumed that AxC1 and AxC3 are associated with a common service provider.

RE 104 includes a controller 160, a layer 1 interface 161 connected to link 110, a layer 2 interface 162, a $SAP_{CM}$ for control and management, a $SAP_S$ for synchronization, a SAN for In-Phase and Quadrature (IQ) data, registers 163, shadow registers 164, a framer 165, a deframer 166, a radio 167, a DMA 170, a memory 168, a link configurations table 169, and an antenna carrier configurations table 180.

Controller 160 performs a configuration process of the interface link that is initiated by REC 102 to determine and implement a first link configuration, which as previously discussed, is based on a first antenna carriers configuration entry. Registers 163 are configured by controller 160, using information from the antenna carriers configuration table 180, to implement the first link configuration. Controller 160 may also perform a reconfiguration process of the interface link that is initiated by REC 102 to implement a second link configuration that is based upon a different antenna carriers configuration entry. In preparation for the change in the link configuration, shadow registers 164 are configured by controller 160 using the second antenna carriers configuration entry, which itself can be received from REC 102 in advance of the change. The entries of shadow registers 164 correspond to some or all of registers 163. Controller 160 configures registers 163 from the entries of shadow registers 164 when the link configuration changes are to take place, which will be described in greater detail herein.

Link configurations table 169 provides similar functionality as link configurations table 129 and includes link configurations information including all link configurations of link 110 that are supported by RE 104. Controller 160 utilizes the information in link configurations table 169 during the auto-negotiation between REC 102 and RE 104 to determine the link configuration of link 110 that both REC 102 and RE 104 support. In an embodiment, controller 160 configures link configurations table 169 during a configuration process prior to bringing link 110 into operation. In another embodiment, controller 160 configures link configurations table 169 during a reset, a restart, an initialization, an update process, and the like.

Antenna carries configurations table 180 provides similar functionality as antenna carrier configurations table 140, and includes entries for two antenna carriers configurations entries 181 and 182, where each entry includes different bandwidth information. Based upon the above stated assumptions, antenna carriers configuration entry 181 is presumed to have a common set of bandwidth entries as does antenna carriers configuration entry 141, and antenna carriers configuration entry 182 is presumed to have a common set of bandwidth entries as does antenna carriers configuration entry 142.

Antenna carriers configuration table 180 also includes a frame map 183 that includes mapping information as described above with reference to frame map 143. In an embodiment, controller 160 stores an initial antenna carriers configuration entry, presumed to be entry 181, at antenna carrier configurations table 180 to support an initial set of antenna carriers. This can occur during an initialization process, wherein the initial antenna carriers configuration entry is also stored at an antenna carriers configuration entry of the REC, which is presumed to be antenna carriers configuration entry 141. Controller 160 can add additional antenna carriers configuration entries during operation of link 110, such as, for example, antenna carriers configuration 182.

Layer 1 interface 161 is a physical layer interface that provides similar functionality as layer 1 interface 121 and performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 162 provides similar functionality as layer 2 interface 122 and provides RE 104 access to the different information flows via service access points $SAP_{CM}$, $SAP_S$, and SAN of RE 104 which correspond to service access points $SAP_{CM}$, $SAP_S$, and SAN of REC 102. $SAP_{CM}$, $SAP_S$, and SAN of RE 104 provide similar functionality as $SAP_{CM}$, $SAP_S$, and $SAP_{IQ}$ of REC 102 and are each associated with $SAP_{CM}$, $SAP_S$, and $SAP_{IQ}$ of REC 102, respectively.

RE 104 can also receive control, management, and synchronization information from REC 102 via communication bus 111 utilizing protocols of communication bus 111. Similarly, RE 104 may also provide information to REC 102 via communication bus 111. Communication bus 111 may allow REC 102 and RE 104 to communicate information in a more efficient manner than communication over link 110 and may allow the use of other protocols outside of link 110.

Registers 163 provide similar functionality as registers 123 and include operating registers of RE 104 including the link 110 configuration and status registers. Controller 160 configures registers 163 during an auto-negotiation to initialize registers 163 to enable communication between REC 102 and RE 104 over link 110 based on an antenna carriers configuration of link 110 agreed upon with REC 102, such as, for example, based upon antenna carriers configuration 181 of RE 104 which has the same configuration information as does antenna carriers configuration 141 of REC 102. Controller 160 further reconfigures registers 163 to change operation of link 110 based on another antenna carriers configuration provided by REC 102, as described in further detail below.

Framer 165 provides similar functionality as framer 125 and multiplexes data flow information received from radio 167, control and management information, synchronization information, and layer 1 interface 161 information into particular frames based on the link configuration at registers 163, which, with respect to antenna carrier data, can be based upon the antenna carriers configuration 181.

Deframer 166 provides similar functionality as deframer 126 and extracts control and management data and layer 1 interface 161 maintenance data from a frame of data received from REC 102 based on the link configuration at registers 163, which includes extracting user plane data from the frame of data based on a given antenna carriers configuration, such as, for example, antenna carriers configuration 181, and forwards it to radio 167 for transmission to user equipment (not shown).

DMA 170 can include a plurality of sets of buffers and associated information; each set of buffers of the plurality, and associated information, is associated with a particular antenna carrier and can be allocated by controller 160 during a configuration process. As shown, DMA 170 includes three sets of buffers 174, 176, 178 and associated information, 175, 177, 179, which can correspond to antenna carriers AxC1, AxC2, and AxC3, respectively. Each set of buffers 174, 176, and 178 include a receive buffer and a transmit buffer that allows the transfer of data over link 110 in an efficient manner.

During operation, REC 102 operates link 110 between REC 102 and RE 104 based on a specific set of antenna carrier configuration information being stored at registers 123 and 163, such as, for example, antenna carriers configuration entries 141 and 181, respectively. The selected configuration information includes antenna carrier mapping information and properties associated with a set of service providers and their associated antennas, including the bandwidth allocated to each antenna carrier's data. At the start of RBS 100 operation, REC 102 performs a reset that includes initializing link configurations table 129 with various link configurations that are supported by REC 102. RE 104 also performs a reset that includes initializing link configurations table 181 with various link configurations that are supported by both REC 102 and RE 104. REC 102 also initializes the buffers at DMA 130 needed to support each antenna carrier, such as, for example, AxC1 131, AxC2 132, and AxC3 133. RE 104 also initializes the buffers at DMA 170 needed to support each of the antenna carriers. Antenna carriers configuration entries of table 140 and their corresponding entries at antenna carrier configurations table 180, e.g., entries 141 and 181, have the same mapping information and properties, and, as such, they are used when setting the registers 123 and 163 to ensure agreement between REC 102 and RE 104 on the configuration of the frames of data communicated on link 110. REC 102 provides management of antenna carriers configuration table 140, which can include adding or deleting antenna carriers configuration entries as needed by RBS 100 operation. Similarly, RE 104 provides management of antenna carrier configurations table 180, such as adding additional antenna carriers configuration entries—primarily in response to information received from the REC.

Controller 120 initiates an auto-negotiation between REC 102 and RE 104, as described in detail below, to determine a link configuration of link 110 that is supported by both REC 102 and RE 104. REC 102 then performs a basic initialization, which loads information from an antenna carriers configuration entry, and from a frame map entry stored at carrier configurations table 140, as well as other information, to registers 123. Once register 123 is fully configured normal operation utilizing link 110 can begin. On the RE 104 side, registers 163 are configured to include the link configuration determined during auto-negotiation, which includes storing information at registers 163 from an antenna carriers configuration entry, and from a frame map entry stored at carrier configurations table 180, that correspond to entries at the antenna carrier configurations table 140 of REC 102. The selected antenna carriers configuration can be, for example, antenna carriers configuration 141 of REC 102 and antenna carriers configuration 181 of RE 104.

During normal operation of link 110 controller 120 of REC 102 can determine that the fullness/emptiness of a DMA buffer of RBS 100 associated with a specific antenna carrier has met a threshold value. For example, controller 120 can receive an indicator from the DMA 130 indicating a buffer is too full or too empty, as described in further detail below.

In response, to a Too Full or Too Empty indicator being received from a specific DMA buffer that is supporting a specific antenna carrier, presumed to be AxC2 for purposes of discussion, controller 120 can determine that link 110 is to operate based on a new antenna carriers configuration. The new antenna carriers configuration will have different antenna carrier bandwidth information that will lower the bandwidth of AxC2, which lowers the data rate of AxC2. Thus allowing the fullness/emptiness of the offending buffer to return to an acceptable level.

According to an embodiment, upon receiving the Too Full or Too Empty indicator, controller 120 will copy the information at antenna carriers configuration entry 141 into a new antenna carriers configuration entry, presumed to be antenna carriers configuration entry 142. Controller 120 then modifies that portion of entry 142 that indicates the bandwidth AxC2. Controller 120 also communicates information to RE 104 causing controller 160 of RE 104 to create a corresponding antenna carriers configuration entry 182. In an embodiment, if an appropriate antenna carriers configuration entry already exists, e.g., it was previously created, controller 120 can merely provide information to controller 160 that identifies the antenna carriers configuration entry to be used when the link configuration is modified.

Each of controller 120 and controller 160 change portions of the shadow registers 124 and 164, respectively, to effectuate the bandwidth, which control operation of the link 110.

It will be appreciated that REC 102 and RE 104 need to reconfigure their registers 123 and 163 at substantially the same time to ensure frame data is not dropped. Thus, controller 120 also determines when the link 110 configuration is to change, and communicates this information to controller 160. In an embodiment, the controller 120 can identify and provide to controller 160 a frame ID of a future frame at which the new link configuration is to be implemented. The frame ID can be associated with a basic frame, a hyper frame, or a radio frame. Other identifying information can be used, such as a frame count that identifies how many more frames will be transmitted using the current link configuration before frames are transmitted using the new link configuration.

In an embodiment, the new configuration information can be transmitted over communication bus 111 or other communication channel that operates outside link 110, in the form of an Ethernet packet, or other protocol.

In response to each of REC 102 and RE 104 determining that the indicator as to when link 110 is to change operation has arrived, controller 120 updates registers 123 with values at shadow registers 124 and controller 160 updates registers 163 with the values at shadow registers 164 to cause the operation of link 110 to change operation with the next packet transmission.

According to an embodiment, the indicator as to when link 110 is to change operation is a specific radio frame number, and REC 102 and RE 104 each monitor radio frame numbers being received to determine when the operation of link 110 is to change. For example controllers 120 and 160 update registers 123 and 163 with the values at shadow registers 124 and 164 in the last radio frame that immediately precedes the frame having the specific radio frame number before the change is to occur (i.e. the radio frame boundary of the change of link operation) to prevent a loss of antenna carrier data. For example, registers specific to bandwidth communication can be updated prior to the radio frame boundary to allow data to be available for transmission at the start of the radio frame boundary of the specific radio frame number. Other configuration registers of registers 123 and 163 can be updated after the radio frame boundary, as needed to ensure proper operation. For example, controllers 120 and 160 can update some portions of registers 123 and 163 in the last radio frame that immediately precedes the frame having the specific radio frame number, e.g., before the change is to occur, as described above, and update other portions of registers 123 and 163 at the very end of processing the last radio frame after all the data of the last radio frame has already been received.

REC 102 continues operation of link 110 based on the updated configuration information, which now reflects the current antenna carriers configuration. For example, link 110 is now configured based upon the antenna carriers configuration entry 142 of table 140 of REC 102. Similarly, RE 104 continues operation of link 110 based on the updated configuration information, based on the antenna carriers configuration entry 182 of table 180.

In response to receiving a Normal Fullness indicator from a buffer, which indicates it is no longer too full or too empty, the controller 120 can determine that link 110 is to operate AxC2 based on its previous configuration, instead of its modified configuration. This can be accomplished in a similar manner as previously described, wherein controller 120 of REC 102 provides to controller 160 information identifying the previously used antenna carriers configuration entry, e.g., entry 141, and an indicator as to when link 110 is to change operation. And each of controller 120 and controller 160 update their respective shadow registers, and monitor the change indicator as to when to change operation, as described above.

It will be appreciated that the reconfiguration of the link 110 can be based on characteristics other than the bandwidth of an antenna carrier. For example, the antenna carriers configuration entries of table 140 can locations that control the sample width of each antenna carrier. For example, controller 120 can create a new antenna carriers configuration entry that specifies a lower data width for samples of AxC2.

Figure 2:
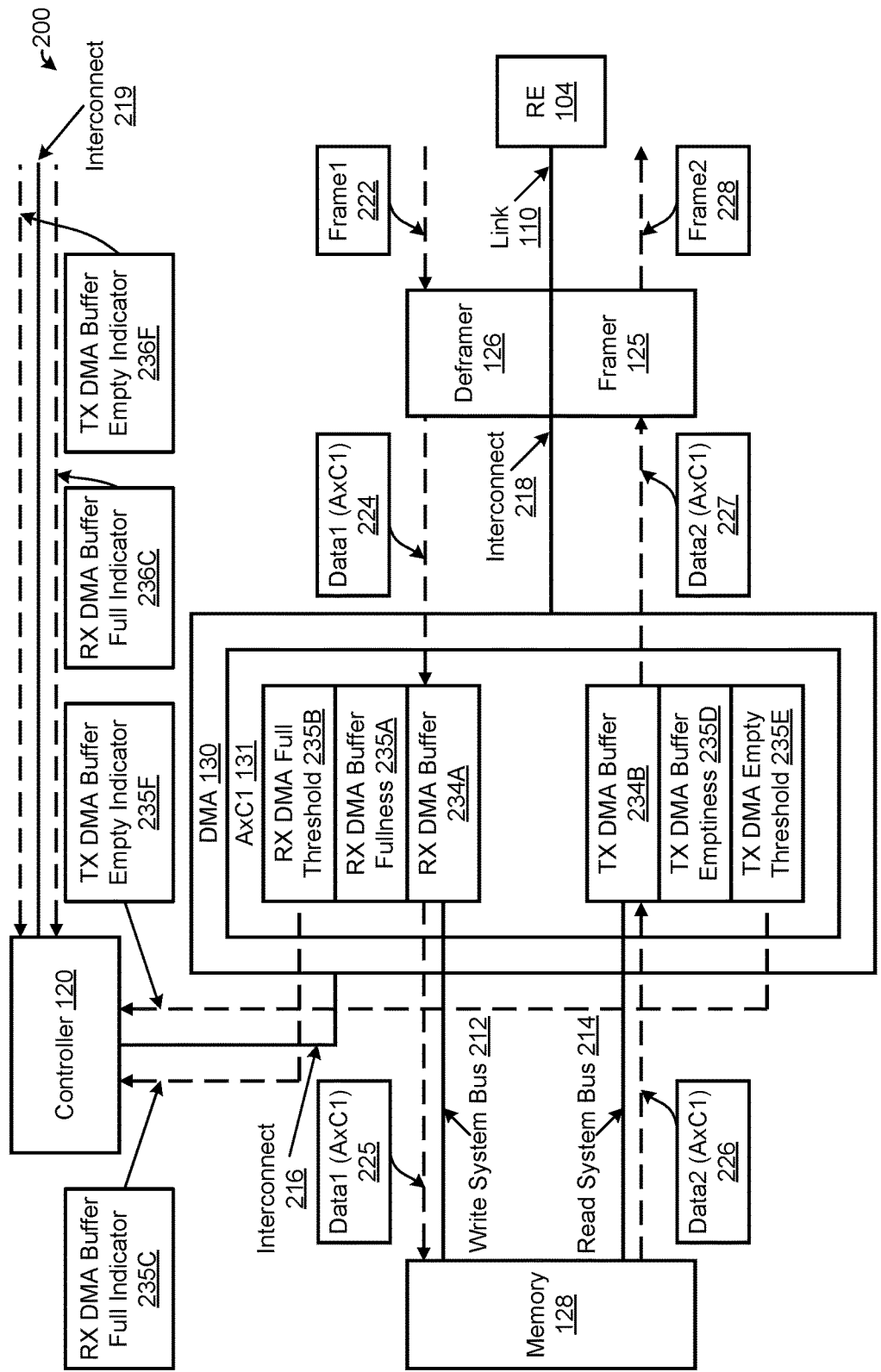
FIG. 2 is a block diagram illustrating a data flow diagram of operation of the DMA of the radio equipment control device of FIG. 1, in accordance with at least one embodiment of the present disclosure.

FIG. 2 illustrates a particular block and data flow diagram 200 of operation of DMA 130 of REC 102 of FIG. 1. In this embodiment, a buffer set including RX DMA Buffer 234A, and TX DMA Buffer 234B, and associated information that supports communications from the REC to the RE for antenna carrier AxC1 131 is illustrated. More specifically, the set of buffers is represented by a receive (RX) DMA buffer 234A and a transmit (TX) DMA buffer 234B. Additional information associated with the RX DMA buffer 234 includes a storage location RX DMA buffer fullness 235A that stores a fill level of the RX buffer, and a storage location RX DMA full threshold 235B that stores a threshold value indicative of a too full condition. Additional information associated with the TX DMA buffer 234B includes a storage location for TX DMA buffer emptiness 235D that stores the fill level of the TX buffer, and a TX DMA empty threshold 235E that stores a threshold value indicative of a too empty condition. Communication between controller 120 and DMA 130 is via interconnect 216, Communication between framer 125, deframer 126, and DMA 130, is via an interconnect 218. Communication between controller 120 and RE 104 is via an interconnect 219. Communication between the framer 125/deframer 126 is via link 110. Data received by REC 102 from RE 104 over link 110 is referred herein as an uplink data flow. Similarly, data transmitted by REC 102 to RE 104 over link 110 is referred herein as a downlink data flow.

When deframer 126 receives a frame1 222 from RE 104 over link 110, deframer 126 de-frames, also referred herein as de-maps, the received frame1 222 into a data1 224 for the antenna carrier AxC1 and communicates data1 224 to DMA 130 via interconnect 218. Note that the de-mapping performed by deframer 126 will typically result in data for other antenna carriers being extracted from frame1 222.

When DMA 130 receives data1 224, DMA 130 stores the data at RX DMA buffer 234A and updates RX DMA buffer fullness 235A with the amount of data stored at the buffer by adding the value of the amount of data of data1 224 to the value of RX DMA buffer fullness 235A. When DMA 130 determines that RX DMA buffer 234A has enough data to be written to the memory 128, a write transaction of data1 225 is initiated on a write system bus 212. When the write transaction is completed, DMA 130 updates RX DMA buffer fullness 235A by subtracting a value of the amount of data1 225 that was written from the value of RX DMA buffer fullness 235A.

While ideally, equilibrium is reached between data received at RX DMA buffer 234A and data transmitted from RX DMA buffer 234A that prevent buffer over-fill and under-fill conditions, in reality this may not be the case. For example, if the write system bus 212 gets overloaded, the rate at which the IQ data is written to memory 128 by the RX DMA buffer 134A can be below the rate needed to support the bandwidth of AxC, e.g., the rate at which data is being stored at RX DMA buffer 234A. If this situation continues, the buffer will continue to fill, and RX DMA buffer 234A will eventually transmit over a RX DMA full indicator 235C having a value of "Too Full" to controller 120. For example, if after updating RX DMA buffer fullness 235A DMA 130 determines the amount of data in RX DMA buffer 234A, as indicated at RX DMA Buffer Fullness 235A, has met the RX DMA Full threshold 235B, the DMA 130 communicates a "Too Full" RX DMA full indicator 235C to controller 120 via interconnect 216. Similarly, when DMA 130 determines the amount of data in RX DMA buffer 234A, as indicated at RX DMA Buffer Fullness 235A, no longer meets the too full criteria, which can be determined using the RX DMA full threshold 235B or a different threshold, the DMA 130 communicates a "Normal Fullness" RX DMA full indicators 235C to controller 120 via interconnect 216 to indicate the buffer is no longer in the too full state. In an embodiment, "Too Full" and "Normal Fullness" RX DMA full indicators 235C can be communicated to controller 120 using interrupt signals. In another embodiment, DMA 130 can communicate "Too Full" and "Normal Fullness" RX DMA full indicators 235C to controller 120 via a message transmitted over communication bus 111. In yet another embodiment, controller 120 may utilize a polling mechanism that monitors "Too Full" and "Normal Fullness" RX DMA full indicators 235C.

The TX DMA buffer 234B operates in a similar manner as the transmit buffer. As Data2 226 becomes available at memory 128, or from other locations, it is written to TX DMA Buffer 234B over the Read System Bus 214, and the value TX DMA buffer emptiness 235D is updated based upon the amount of stored data to indicate a current fill level. When DMA 130 determines that TX DMA buffer 234B has enough data to be written to framer 125, a write transaction is initiated over interconnect 218 to provide the data2 227 to the framer 125 for transmission over link 110, and the value TX DMA buffer emptiness 235D is updated based upon the amount of data written.

If the read system bus 214 gets overloaded, the rate at which the IQ data is received at the TX DMA buffer 234B can be below the rate needed to support the transmit bandwidth of AxC1. If this situation continues, the buffer will begin to empty, and RX DMA buffer 234B will eventually transmit a value over the TX DMA empty indicator 235F a value of "Too Empty" to controller 120. For example, if after updating TX DMA buffer fullness 235B DMA 130 determines the amount of data in RX DMA buffer 234A, as indicated at RX DMA Buffer emptiness 235D, has met the TX DMA empty threshold 235E, the DMA 130 will communicate the "Too Empty" value. Similarly, when DMA 130 determines the amount of data in TX DMA buffer 234B no longer meets the too empty criteria, which can be determined using the TX DMA empty threshold 235E or a different threshold, the DMA 130 communicates a "Normal Fullness" value for TX DMA buffer full indicator 235F to controller 120 via interconnect 216 to indicate the buffer is no longer in the too empty state.

DMA 170 of RE 104 of FIG. 3 operates in a similar manner as DMA 130 of REC 102, described in detail below. For example, when RE 104 determines that its RX/TX DMA buffers have met DMA full/empty thresholds or no longer meet the DMA full/empty thresholds, RE 104 communicates the "Too Full"/"Too Empty" or "Normal Fullness" values for RX DMA buffer full indicator 236C and TX DMA buffer empty indicator 236F to REC 102 for similar processing as described above.

In an embodiment, RX DMA Full threshold 235B, a different RX DMA full threshold, TX DMA empty threshold 235E, and a different TX DMA empty threshold are programmable.

Figure 3:
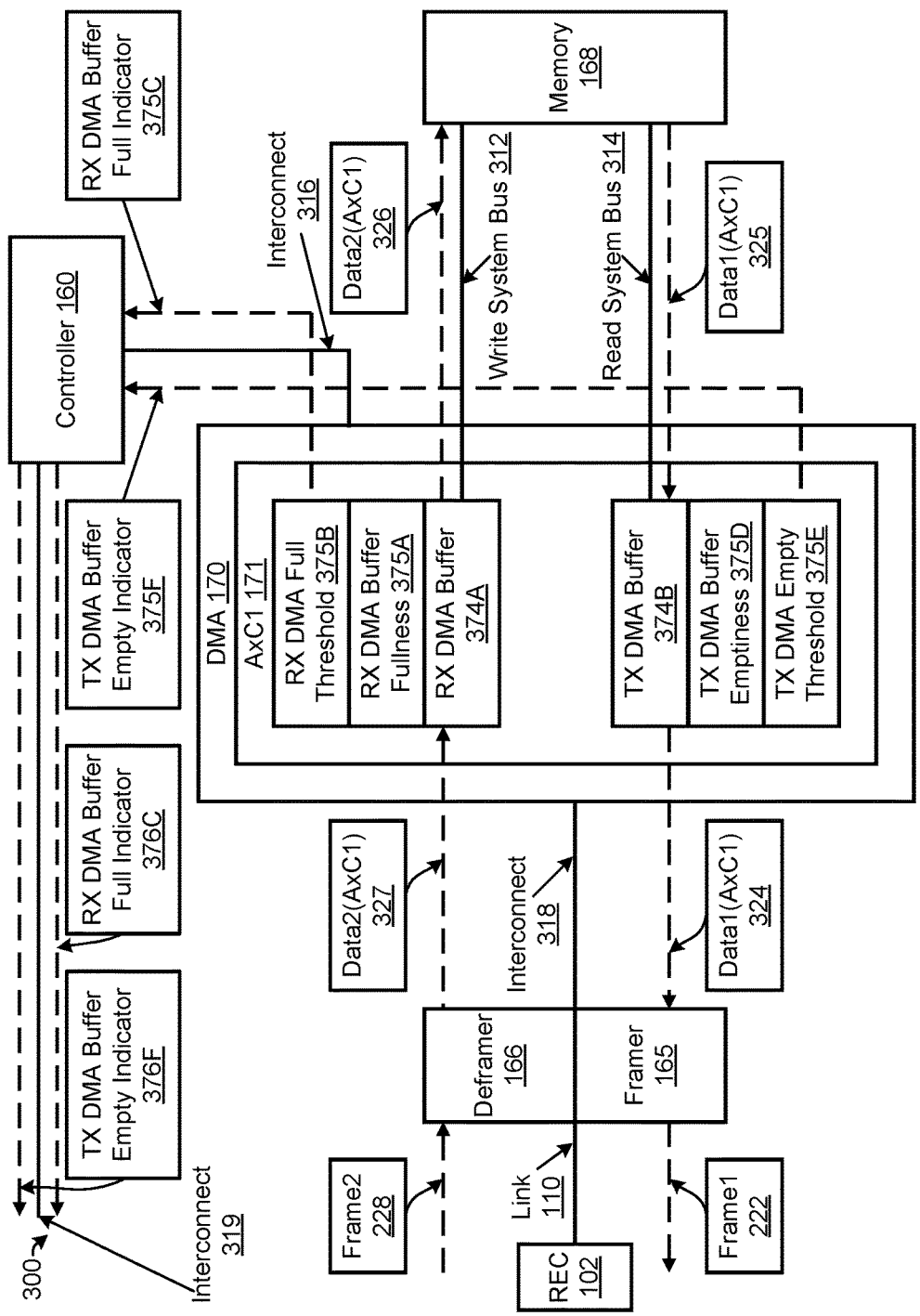
FIG. 3 is a block diagram illustrating a data flow diagram of operation of the DMA of the radio equipment device of FIG. 1, in accordance with at least one embodiment of the present disclosure.

FIG. 3 illustrates a particular block and data flow diagram 300 of operation of DMA 170 of REC 104 of FIG. 1. This embodiment illustrates a buffer set including TX DMA Buffer 374A and RX DMA Buffer 374B, which include associated information that supports communications between RE 104 and REC 102 for antenna carrier AxC1 131. Additional information associated with the RX DMA buffer 234 includes a storage location for RX DMA buffer fullness 375A, and a storage location for RX DMA full threshold 375B. Additional information associated with the TX DMA buffer 374B includes a storage location for TX DMA buffer emptiness 375D, and a TX DMA empty threshold 375E.

Communications between controller 160 and DMA 170 is via interconnect 316, Communication between framer 165, deframer 166, and DMA 170, is via an interconnect 318. Communication between controller 160 and RE 104 is via an interconnect 318. Communication between the framer 125/deframer 126 and REC 102 is via link 110.

RX DMA buffer 274A and RX DMA buffer 374A operate similarly, by virtue of their both receiving data from the link 110. TX DMA buffer 374B and TX DMA buffer 334B operate similarly, by virtue of providing data to their respective memories, memory 128 and memory 168. Thus, RX DMA Buffer 374A of RE 104 and RX DMA buffer 234A of REC 102 are along an up-link path of the communication system, and TX DMA Buffer 374B of RE 104 and TX DMA Buffer 234B of REC 102 are along the down-link path of the communication system, and they are servicing the same antenna carrier, e.g., AxC1.

Information received at deframer 166 via link 110 is information that was originally transmitted to link 110 by REC 102, where it was at one point stored at the TX DMA Buffer 234B. Thus, frame2 238 is received at deframer 126, which de-frames data2 327, which is the AxC1 information from the frame, and communicates this information to DMA 170 via the write system bus 318. Note that the de-mapping performed by deframer 166 will typically deframe data for other antenna carriers from frame2 228 and provide it to DMA 170 for storage at other buffers.

When DMA 170 receives data2 327, DMA 170 stores the data at RX DMA buffer 374A and updates RX DMA buffer fullness 375A as previously described. When DMA 170 determines that RX DMA buffer 374A has enough data to be written to memory 168, or other destination, a write transaction is initiated on write system bus 312. DMA 130 then updates RX DMA buffer fullness 375A with the amount of data of data2 326 that was written to memory 128 by subtracting the value of amount of data of data1 225 from the value of RX DMA buffer fullness 235A.

While ideally, equilibrium is reached between data received at the RX DMA buffer 374A and data transmitted from RX DMA buffer 234A, in reality this may not be the case. For example, if the write system bus 312 gets overloaded as previously described with respect to the REC 102. As such, RX DMA buffer 374 may become too full, in the same context as can RX DMA buffer 334A previously discussed. Therefore, if DMA 170 determines the amount of data in RX DMA buffer 374A, as indicated at RX DMA buffer fullness 275A, has met the RX DMA full threshold 375B, DMA 170 communicates a "Too Full" RX DMA buffer full indication 375C to controller 160 via interconnect 316. Similarly, when DMA 170 determines the amount of data in RX DMA buffer 374A no longer meets the too full criteria, which can be determined using the RX DMA full threshold 235B, or other threshold, the DMA 170 communicates a "Normal Fullness" RX DMA buffer full indication 375C to controller 160 via interconnect 316.

In a similar manner, TX DMA buffer 374B receives information from memory 168 for transmission over link 110. As illustrated, a data1 325 has been received at DMA 170 via read system bus 314, and is written at TX DMA buffer 374B. When DMA 170 determines that TX DMA buffer 374B has enough data to be written to framer 165, a write transaction is initiated over interconnect 318. DMA 170 updates TX DMA buffer emptiness 235B with the amount of data of data1 325 received at TX DMA buffer 374B and the amount of data 324 transmitted from TX DMA buffer 374B, and performs the emptiness check each time.

As with REC 102 TX DMA buffer 234B, if the read system bus 312 gets overloaded, the rate at which the IQ data for AxC1 is received at the TX DMA buffer 374B can drop below the rate needed to support long term transmission of AxC1 data over link 110. If this situation continues, the buffer will begin to empty, and a "Too Empty" value will eventually be transmitted by the DMA 170 over TX DMA buffer empty indication 375F to controller 160. Subsequently, when DMA 170 determines the amount of data in TX DMA buffer 374B no longer meets the too empty criteria, which can be determined using the TX DMA empty threshold 375E, or other threshold, the DMA 170 communicates a "Normal Emptiness" TX DMA buffer empty indication 375E to controller 160 via interconnect 316.

Controller 160 forwards a TX DMA buffer empty indicator 376F, and a RX DMA buffer full indicator 376C to controller 120 of the REC 102 for handling. When controller 120 receives a "Too Full" value at RX DMA Full indicator 236C, or a "Too Empty" value at TX DMA Full indicator 236F, the configuration of link 110 will be changed, as previously described, to lower the data rate of the antenna carrier serviced by RX DMA Buffer 374A. When controller 120 receives a "Normal Fullness" value at RX DMA Full indicator 236C, or a "Normal Fullness" value at TX DMA Full indicator 236F, the configuration of link 110 will be changed, as previously described, to increase the data rate of the antenna carrier serviced by TX DMA Buffer 374B, such as to its original level.

In an embodiment, RX DMA Full threshold 375B, a different RX DMA full threshold, TX DMA empty threshold 375E, and a different TX DMA empty threshold are programmable.

By DMAs 130 and 170 detecting the possibility of a data over-run and/or a data under-run ahead of the actual occurrence, REC 102 and RE 104 can have sufficient time to be able to mitigate or eliminate the data over-run and/or the data under-run by lowering the data bandwidth of the relevant active antenna carrier over link 110. This reduces the probability for over writing data in the receive buffers in response to an over-run condition, and transmitting indeterminate data in response to an under-run condition that can cause loss of synchronization, which can result in meaningful service down time can occur due to the data over-run and/or the data under-run caused by temporary high load on the system busses is minimized. Reconfiguration of link 110 without the typical auto-negotiation process that initially establishes link 110 avoids dropping of data. In this manner, performing automatic load adaptive dynamic reconfiguration of an active antenna carrier's communication bandwidth over link 110 allows service providers' communication to be continuous without any disruption, and modifications of the service providers' communication as operating conditions warrant. For example, all data of an antenna carrier's communication is transmitted, as opposed to some data being discarded.

Figure 4:
FIG. 4 is a block diagram illustrating basic representations of two possible basic frame configurations that may be utilized to communicate frames of data over an interface link between a radio equipment control device and a radio equipment device, in accordance with at least one embodiment of the present disclosure.

FIG. 4 illustrates basic representations of two possible basic frame configurations, 490 and 491, each of which are used to define the specific characteristics of frames transmitted over link 110 at a given point in time. The basic frame configuration 490 is presumed to be based upon the antenna carrier information stored at antenna carriers configuration entry 141 of table 140. The basic frame configuration 491 is presumed to be based upon the antenna carrier information stored at antenna carriers configuration entry 142 of table 140.

When frames transmitting IQ data over link 110 are based upon basic frame configuration 490, each instance of the frame includes two samples of IQ data for antenna carrier AxC1, at sample locations labeled AxC1 411 and 412, four samples of IQ data for antenna carrier AxC2, at sample locations labeled AxC2 421-424, and two samples of IQ data of antenna carrier AxC3, at sample locations labeled AxC3 431 and 432. When frames transmitting IQ data over link 110 are based upon the basic frame configuration 491, each instance of the frame includes two samples of IQ data for antenna carrier AxC1, at sample locations labeled AxC1 411 and 412, two samples of IQ data for antenna carrier AxC2, at sample locations labeled AxC2 421 and 422, two samples of IQ data of antenna carrier AxC3, at sample locations labeled AxC3 431 and 432, and two unassigned antenna carrier samples at sample locations 423 and 424 that have no valid IQ data. Each sample of IQ data can also be referred to as an antenna carrier sample.

Thus, a characteristic of frames based upon basic frame configuration 490 is that each frame includes two samples of AxC1 data, each frame includes four samples of AxC2 data, each frame includes two samples of AxC1 data and each frame includes four samples of AxC2 data, and so on.

Basic frame configuration 490 may be utilized to communicate frames of IQ data over link 110 in response to a particular frame selection criterion. For example, based upon the fullness/emptiness of each antenna carriers' associated DMA buffers during operation, where basic frame configuration 490 could be used to communicate frames of IQ data when the fullness/emptiness of each antenna carriers' associated DMA buffers is within their threshold values ("Original") and basic frame configuration 491 could be used to communicate frames of IQ data when the fullness/emptiness of one or more antenna carriers' associated DMA buffers has met one of their threshold values ("Modified").

The bandwidth of antenna carrier AxC1 is represented in basic frame configuration 490 by the number of samples labeled AxC2, e.g., samples AxC2 421-424. The bandwidth of antenna carrier AxC2 is represented in basic frame configuration 491 by the number of samples labeled AxC2, e.g., samples AxC2 421-422. Therefore, assuming each sample communicates the same amount of information, the bandwidth of antenna carrier AxC2 is halved in response to the configuration change, while the bandwidths of antenna carriers AxC1 and AxC3 remain the same when going from original operation of link 110 to modified operation of link 110.

Figure 5:
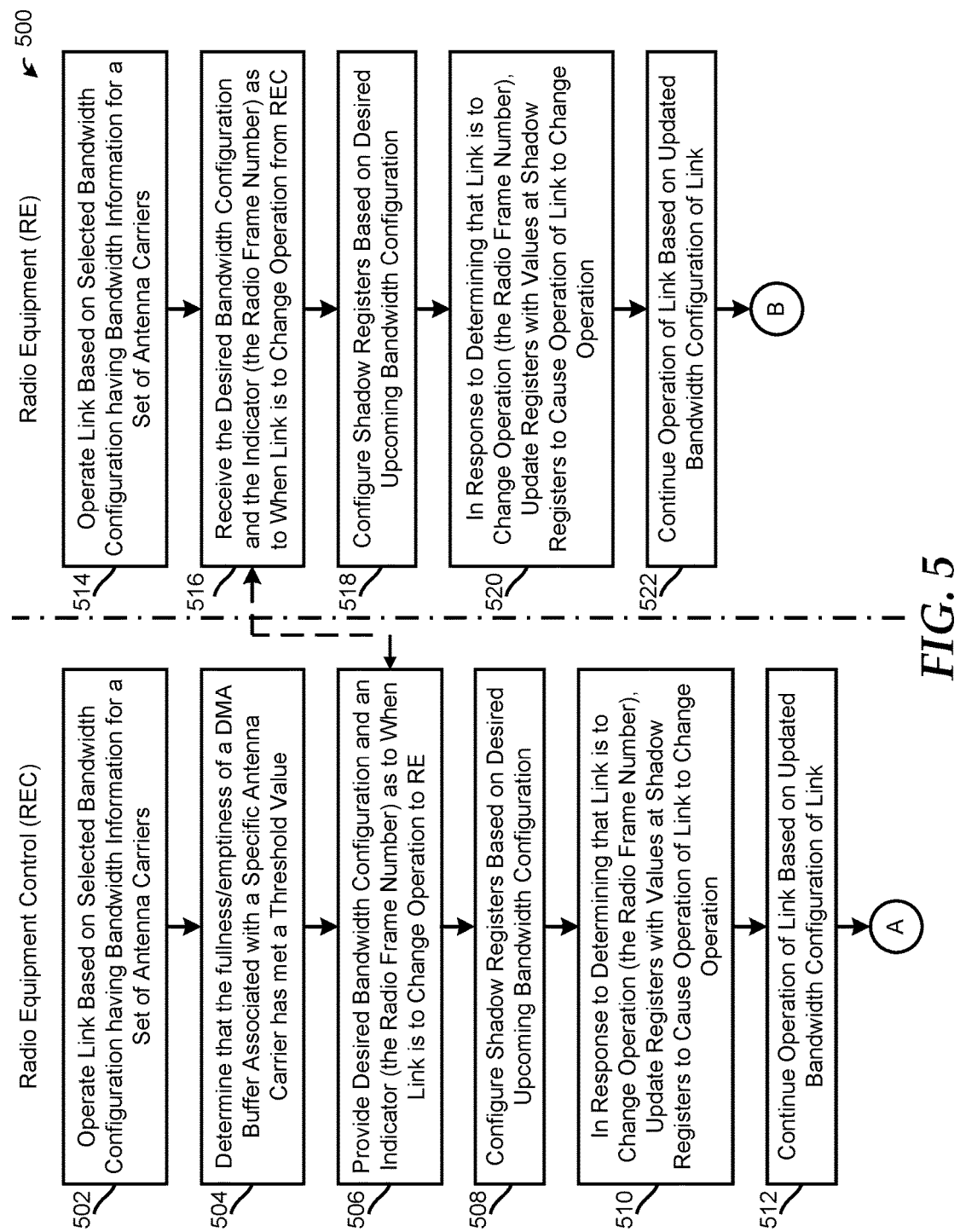
FIGS. 5 and 6 illustrate a method for performing automatic load adaptive dynamic reconfiguration of an active antenna carrier's communication bandwidth over the interface link in operation of the radio base station system of FIG. 1, in accordance with at least one embodiment of the present disclosure.
Figure 6:
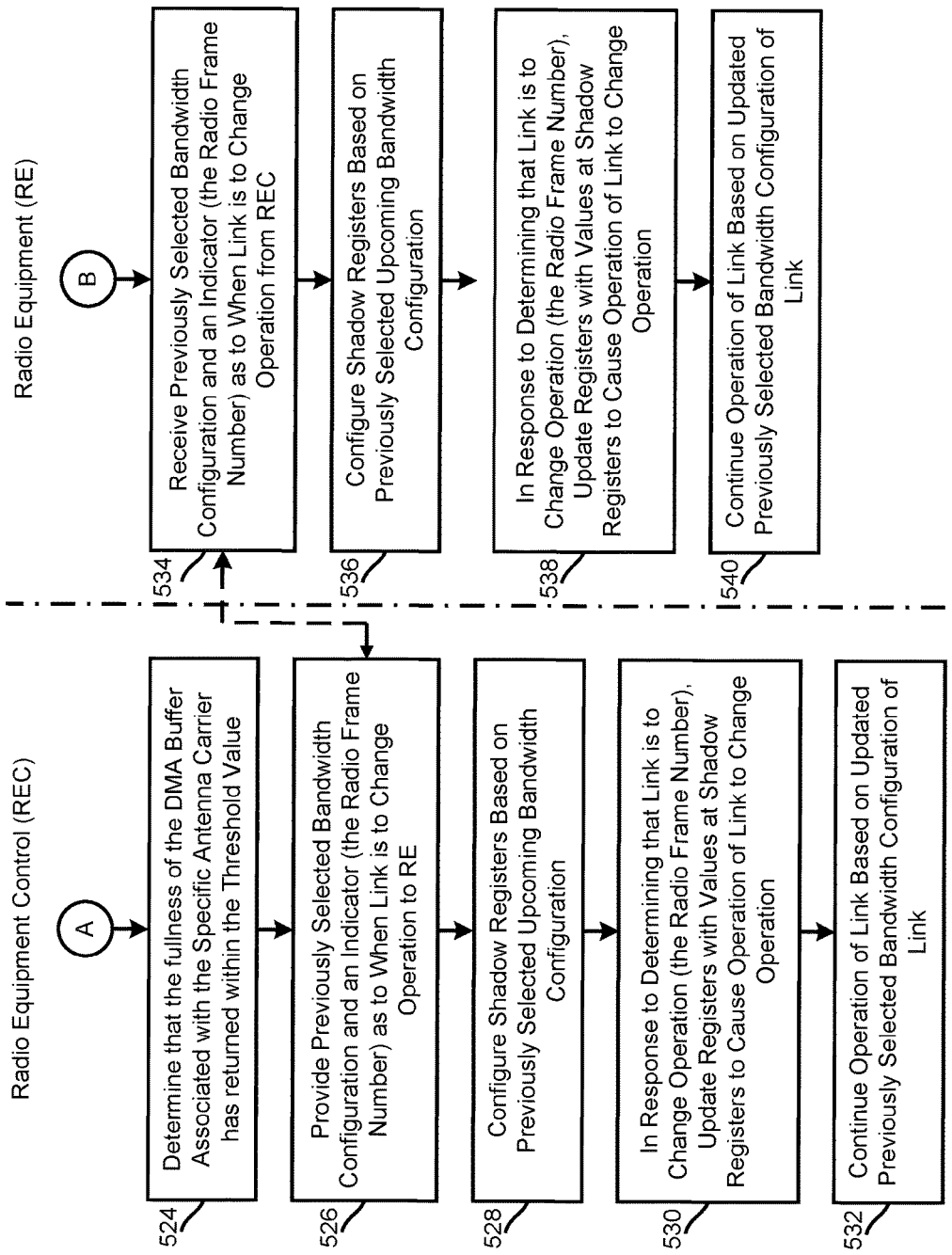

FIGS. 5 and 6 illustrate a method 500 for performing automatic load adaptive dynamic reconfiguration of an active antenna carrier's communication bandwidth over an interface link in operation of the RBS 100 of FIG. 1, where the exemplary method 500 begins at the REC side at block 502 and at the RE side at block 514 described below. Prior to blocks 502 and 514, an auto-negotiation has occurred between the REC and RE, as will be described in greater detail below.

At block 502, REC 102 of RBS 100 operates link 110 between REC 102 and RE 104 in an uplink and a down link direction based on a bandwidth configuration that was previously selected, such as during an initial configuration of link 110. During operation, in a downlink direction, the REC 102 receives data information for a set of antenna carriers that will be transmitted to the RE over consecutive instances of a data frame over link 110 as previously described. Each antenna carrier's received data is stored in a respective transmit buffer dedicated to that antenna carrier. Each antenna carrier of the set of antenna carriers is configured to have a particular bandwidth, e.g., number of antenna carrier samples. Similarly, REC 102 receives data information over consecutive instances of the frame in the uplink direction that are transmitted by the RE. The data information includes a first portion and a second portion, wherein, as described below, the first portion and second portion are transmitted in different contiguous instances of the frame over link 110; the first portion is to be processed prior to the second portion, and contiguous data as used herein refers two instances of the same frame sent in time ordered sequence with no intervening instances. Each antenna carrier of the set of antenna carriers can be associated with the same or different service provider as each other antenna carrier of the set. REC 102 also receives portions of data information for the set of service providers from the RE over link 110, the up-link direction, in a similar manner. Wherein each antenna carrier's information received from the RE is stored at a respective receive buffer dedicated to that antenna carrier.

At block 504, controller 120 of REC 102 determines if a receive buffer, which is on the uplink side of link 110, of a particular antenna carrier is too full, or if a transmit buffer, which is on the downlink side of link 110, of the particular antenna carrier is to empty. A too full condition can be determined in response to an amount of data at the receive buffer meeting a fullness threshold. A too empty condition can be determined in response to an amount of data at the transmit buffer meeting an emptiness threshold. In response to either the too full or to the too empty indicator, REC 102 decides to reconfigure link 110 in the downlink direction, or the uplink directions, respectively, to transmit frames frame based on a new antenna carriers configuration, presumed to be antenna carriers configuration 142, instead of the current antenna carriers configuration, presumed to be antenna carriers configuration 142. The new antenna carriers configuration lowers the data bandwidth allocated to the specific antenna carrier in the particular direction, while leaving the bandwidth of the other antenna carriers unchanged, so that the occurrence of a data under-run and a data over-run at the offending buffer is mitigated or eliminated. It will be appreciated that in another embodiment, the new antenna carriers configuration can used to change the frame configuration in both the uplink and downlink directions, even though only one of the particular antenna carriers receive and transmit buffer is too full or too empty, respectively.

At block 506, controller 120 of REC 102 provides information to RE 104 that indicates the bandwidth of the streaming data of the particular antenna carrier will change at a future time to transmit the particular antenna carrier at a lower data rate. For example, REC 102 can provide to RE 104 the new bandwidth configuration of the particular antenna carrier in the downlink direction, and an indicator as to when link 110 is to change operation. The indicator can be, for example, a radio frame having a specific radio frame number to be received over link 110 that indicates when to change operation, as indicated by the dashed arrow between block 506 and block 516. In an embodiment, RE 104 provides a confirmation to REC 102 that RE 104 has received the change information, as indicated by the dashed arrow between block 516 and block 506.

At block 508, controller 120 of REC 102 configures shadow registers 124 based on the new upcoming antenna carriers configuration. At block 510, in response to REC 102 determining that the indicator as to when link 110 is to change operation indicates that operation is to change now, such as, for example, that the radio frame having the specific radio frame number is next to be transmitted over link 110 to RE 104, controller 120 updates registers 123 with values at shadow registers 124 to cause the operation of link 110 to change operation. Thus, it will be appreciated that REC 102 transmits the first portion of the received data information in the last instance of the frame prior to the configuration change of link 110; and REC 102 transmits the second portion of the received data information in the first instance of the frame after the configuration change of link 110. Wherein, for example, prior to the configuration change streaming data of the particular antenna carrier, which includes the first portion, is transmitted in four antenna carrier samples of the frame, and after the configuration change streaming data of the particular antenna carrier, which includes the second portion, is transmitted in two antenna samples of the frame. At block 512, REC 102 continues operation of link 110 based on the new antenna carriers configuration of link 110, now the current antenna carriers configuration.

At block 514, in parallel to block 502 as described above, RE 104 of RBS 100 operates link 110 between REC 102 and RE 104 based on the same antenna carrier configuration as REC as indicated at block 502. At block 516, controller 160 of RE 104 receives the information from the REC (block 506) that indicates the bandwidth of the streaming data of the particular antenna carrier will change at a future time to transmit the particular antenna carrier at a lower data rate in the indicated direction. For example, the REC can provide to the RE the new bandwidth configuration of the particular antenna carrier in the downlink direction, and an indicator as to when link 110 is to change operation. The indicator that indicates when to change operation can be, for example, a radio frame having a specific radio frame number to be received at RE 104 over link 110, as indicated by the dashed arrow between block 506 and block 516. In an embodiment, RE 104 provides a confirmation to REC 102 that RE 104 has received the change information, as indicated by the dashed arrow between block 516 and block 506.

At block 518, controller 160 configures shadow registers 164 based on the new upcoming antenna carriers configuration. At block 520, in response to RE 104 determining that the indicator as to when link 110 is to change operation indicates that operation is to change now, controller 160 updates registers 163 with values at shadow registers 164 to cause the operation of link 110 at RE 104 to change operation. Thus, it will be appreciated that REC 102 receives the first portion of the received data information in the last instance of the frame prior to the configuration change of link 110, and saves streaming information for the particular antenna carrier from the first portion at a receive buffer; and REC 102 receives the second portion of the received data information in the first instance of the frame after the configuration change of link 110, and saves streaming information for the particular antenna carrier from the second portion at the receive buffer. Wherein, for example, prior to the configuration change streaming data of the particular antenna carrier, which includes the first portion, is receive in four antenna carrier samples of the frame, and after the configuration change streaming data of the particular antenna carrier, which includes the second portion, is received in two antenna samples of the frame. At block 522, RE 104 continues operation of link 110 based on the new antenna carriers configuration of link 110, now the current antenna carriers configuration.

At block 524 (FIG. 6), controller 120 of REC 102 determines that a receive buffer that was previously found to be too full, or that a transmit buffer that was previously too empty, has returned to an acceptable fullness. At block 526, controller 120 of REC 102 provides to RE 104 the previously selected antenna carriers configuration, such as, for example, antenna carriers configuration 141, and an indicator as to when link 110 is to change operation to RE 104, as indicated by the dashed arrow between block 526 and block 534. In an embodiment, RE 104 provides a confirmation to REC 102 that RE 104 has received the change information, as indicated by the dashed arrow between block 534 and block 526.

At block 528, controller 120 of REC 102 configures shadow registers 124 based on the previously selected upcoming antenna carriers configuration. At block 530, in response to REC 102 determining that the indicator as to when link 110 is to change operation indicates that operation is to change now, controller 120 updates registers 123 with values at shadow registers 124 to cause the operation of link 110 to change operation.

At block 532, REC 102 continues operation of link 110 based on the updated antenna carriers configuration of link 110, now the current antenna carriers configuration.

At block 534, controller 160 of RE 104 receives the information from REC 102 providing the previously selected antenna carriers configuration and the indicator as to when link 110 is to change operation. In an embodiment, RE 104 provides a confirmation to REC 102 that RE 104 has received the previously selected antenna carriers configuration and the indicator as to when link 110 is to change operation.

At block 536, controller 160 of RE 104 configures shadow registers 164 based on the newly received information, which is the previously selected antenna carriers configuration. At block 538, in response to RE 104 determining that the indicator as to when link 110 is to change operation indicates that operation is to change now, controller 160 updates registers 163 with values at shadow registers 164 to cause the operation of link 110 to change operation. At block 540, RE 104 continues operation of link 110 based on the updated antenna carriers configuration of link 110.

As such, method 500 for performing automatic load adaptive dynamic reconfiguration of an active antenna carrier's communication bandwidth over an interface link in operation of RBS 100 has successfully completed.

The following describes the auto-negotiation process between REC 102 and RE 104 in further detail. REC 102 performs the auto-negotiation between REC 102 and RE 104 to determine the link configuration of link 110 that is supported by both REC 102 and RE 104 in the following manner. Since link 110 may have been set up when the link configurations of REC 102 operate and the link configurations of RE 104 operate, are not initially known to each other, REC 102 and RE 104 must try different link configurations until a common link configuration is determined. Thus, REC 102 performs the auto-negotiation between REC 102 and RE 104 to determine the link configuration of link 110 that is supported by both REC 102 and RE 104. The following description is based on the CPRI nomenclature, but is not limited to just CPRI interfaces, but instead, may be employed in RBSs utilizing any interfaces between a REC and a RE.

The auto-negotiation process starts by determining the link bit rate of link 110 and reaching layer 1 synchronization between REC 102 and RE 104. REC 102 starts to transmit over link 110 to RE 104 using, for example, the highest available link bit rate from link configurations table 129 of REC 102 and also attempts to receive over link 110 from RE 104 at the same link bit rate. If REC 102 does not reach layer 1 synchronization, (i.e., REC 102 does not receive the proper information and at the proper repetition rate), REC 102 selects, after an appropriate time delay, another available link bit rate from link configurations table 129 of REC 102, for example the next highest available link bit rate, and REC 102 starts to transmit/receive over link 110 to/from RE 104 using the other available link bit rate. This process proceeds until REC 102 reaches layer 1 synchronization with RE 104.

On the other side of link 110, RE 104 starts to receive over link 110 from REC 102 using, for example, the highest available link bit rate from link configurations table 169 of RE 104. If RE 104 does not reach layer 1 synchronization, (i.e., RE 104 does not receive the proper information and at the proper repetition rate), RE 104 selects, after a second appropriate time delay which may be different than the time delay utilized by REC 102, another available link bit rate from link configurations table 169 of RE 104, for example the next highest available link bit rate, and starts to receive over link 110 from REC 102 using the other available link bit rate. This process proceeds until RE 104 reaches layer 1 synchronization with REC 102. When RE 104 reaches synchronization of layer 1, RE 104 starts to transmit over link 110 to REC 102 at the same link bit rate that RE 104 successfully received at. At this point, synchronization of layer 1 of link 110 between REC 102 and RE 104 has been achieved with bi-directional communication.

In response to successfully determining the link bit rate that REC 102 and RE 104 support and achieving synchronization of layer 1 of link 110, the auto-negotiation process proceeds by determining the link protocol of link 110 that both REC 102 and RE 104 support. Similar to determining the link bit rate of link 110, REC 102 and RE 104 each propose, for example, the highest link protocol of its link configurations table 129 and 169, respectively. REC 102 and RE 104 then compare the other's proposed highest link protocol with all the link protocols of its link configurations table 129 and 169 to determine a match. If a match is not determined, REC 102 and RE 104 propose, for example, the next highest link protocol of its link configurations table 129 and 169 and determine if there is a matching link protocol as described above. This auto-negotiation process proceeds until REC 102 and RE 104 determines the same link protocol that both support and the auto-negotiation proceeds using the same link protocol.

In response to successfully determining the same link protocol, the auto-negotiation process proceeds to determine a layer 2 fast control and management link bit rate of link 110 for communication that utilizes Ethernet protocol and a layer 2 slow control and management link bit rate of link 110 for communication that utilizes HDLC protocol that both REC 102 and RE 104 support. The auto-negotiation process to determine the fast and the slow control and management link bit rate proceeds in parallel, with each fast/slow control management link bit rate determined similar to how the auto-negotiation process determined the link bit rate of link 110 as described above. As such, REC 102 and RE 104 determines the fast/slow control and management link bit rate of link 110 by successively trying an available fast/slow control and management link bit rate of each link configurations table 129 of REC 102 and 169 of RE 104 until the same fast/slow control and management link bit rate of link 110 that both REC 102 and RE 104 support is determined.

In response to successfully determining the same fast/slow control and management link bit rate, the auto-negotiation process proceeds to determine a vendor-specific interface usage that both REC 102 and RE 104 support. The auto-negotiation to determine the same vendor-specific interface usage, for example vendor-specific interface capabilities and capability limitations, can be accomplished in a similar manner as described above for the other link configuration characteristics and results in the same (preferred) vendor-specific interface usage based on vendor-specific requirements. At this point, the auto-negotiation has completed and determined the link configuration of link 110 that is supported by both REC 102 and RE 104 and the link configuration registers 123 include the values of the link configuration of link 110.

It will be appreciated that the devices disclosed herein can be implemented in various manners using various types of memory.

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

REC 102, RE 104, controllers 120 and 160, layer 1 interfaces 121 and 161, layer 2 interfaces 122 and 162, framers 125 and 165, deframers 126 and 166, memories 128 and 168, DMAs 130 and 170, radio 167, network interface 112, and air interface 113 can be provided by, for example, an instruction based digital signal processor, an application specific integrated circuit device, a field programmable gate array (FPGA), a General Purpose Processor (GPP), another type of logic circuit capable of performing operations, the like, and combinations thereof. In an exemplary embodiment, REC 102 represents a digital baseband signal processor and RE 104 represents a digital signal processor.

According to one aspect, a method is disclosed in accordance with at least one embodiment of the present disclosure. The method includes determining, at an REC device of a radio base station, that a first transmit Direct Memory Access (TDMA) buffer is too empty in response to determining that a current amount of data at the TDMA buffer has met a first TDMA empty threshold, wherein the TDMA stores streaming data for a first antenna carrier being transmitted over an interface link to a Radio Equipment device for wireless transmission. The method further includes in response to determining the TDMA buffer is too empty, transmitting, from the REC device, a first indicator, for reception by a Radio Equipment (RE) device, that indicates the streaming data will be transmitted by the REC device at a lower data rate at a future time. The method also includes prior to the future time, transmitting, over the interface link, streaming data over first frame instances based on a first configuration, wherein the first configuration indicates streaming data is being transmitted over a first number of antenna carrier samples of each of the first frame instances. The method further includes at the future time, transmitting streaming data over second frame instances based on a second configuration, where the second configuration indicates streaming data is being transmitted over a second number antenna carrier samples of each of the second frame instances, where a last transmitted instance of the first frame instance is contiguous with a first-in-order instance of the second frame instances, where the total number of carrier samples is the same for the first and second frame instances.

In an embodiment, a rate at which data is removed from the first TDMA buffer is reduced in response to transmitting the first transmit data over the second frame instances as compared to transmitting the streaming data over the first frame instances. In an embodiment, the emptiness of the first TDMA buffer is based upon an amount of transmit data in the first TDMA buffer. In an embodiment, the first configuration further indicates that streaming data of a second antenna carrier being transmitted over the first frame instances are being transmitted over a third number of carrier samples of the frame, where the third number can be the same or different than the first and the second number, and the second configuration further indicates that the streaming data is being transmitted over the third number of carrier samples of the frame. In an embodiment, the method also includes determining, after the future time, that the TDMA buffer is no longer too empty. In an embodiment, the method further includes in response to determining the TDMA buffer is no longer too empty, transmitting, from the REC device, a second indicator, for reception by the RE device, that indicates that at another future time the first antenna carrier will be transmitted by the REC device over third frame instances based upon the first configuration. In an embodiment, the method also includes at the another future time, begin transmitting streaming data for the first antenna carrier over the third frame instances, where a last transmitted instance of the second frame instances is contiguous with a first-in-order instance of the third frame instances. In an embodiment, the value of the TDMA empty threshold is programmable. In an embodiment, the value of the TDMA empty threshold and a value of a second TDMA empty threshold value that is used in determining that the TDMA buffer is no longer too empty are different values. In an embodiment, the method also includes determining, at the REC device after the future time while second frame instances are being transmitted, that a receive Direct Memory Access (RDMA) buffer is too full in response to determining that a current amount of data at the RDMA buffer has met a first RDMA full threshold, where the RDMA stores streaming data for a second antenna carrier being received from the RE device over a third number of carrier samples second frame instances, where the third number can be the same or different than the first and second number. In an embodiment, the method further includes in response to determining the RDMA buffer is too full, transmitting, from the REC device, a second indicator, for reception by a Radio Equipment (RE) device, that indicates the streaming data will be transmitted at a lower data rate at another future time. In an embodiment, the method also includes after the another future time, transmitting streaming data over third frame instances based on a third configuration, where the third configuration indicates that the third frame instances transmit the streaming data over the second number of antenna carrier samples, and indicates that the third frame instances transmit the streaming data over a fourth number of antenna carrier samples, the fourth number being different than the third number, and the same or different as the first number and the second number. In an embodiment, the interface link includes one or more of a common public radio interface (CPRI) and an open base station architecture initiative (OBSAI) interface.

According to another aspect, a radio equipment control system is disclosed in accordance with at least one embodiment of the present disclosure. The radio equipment control system includes a radio equipment control (REC) device to transmit packetized streaming data over a first interconnect to a Radio Equipment (RE) device for wireless transmission, including streaming data for a first antenna carrier, the REC device having a device controller, a Direct Memory Access (DMA) controller, a framer, and a configuration register. The DMA controller to configure a first transmit buffer to store streaming data received at the REC device, and includes an emptiness monitoring logic having a first register to store an indicator of an amount of data saved at the first transmit buffer, and a second register to store a first empty threshold value, the DMA controller coupled to provide a too empty indicator for the first transmit buffer to the device controller in response to the value of the first register matching a value of the second register. The framer to generate frames of the packetized streaming data, each frame having a total number of antenna carrier samples, a number of antenna carrier samples over which the framer is to transmit data from the first transmit buffer is based upon a frame configuration type that is stored at a configuration register, where for a first frame configuration type, the number of the frame's antenna samples over which the framer is to transmit data from the first transmit buffer is a first value, and for a second frame configuration type, the number of the frame's antenna samples over which the framer is to transmit data from the first transmit buffer is a second value. In response to receiving an instance of the too empty indicator for the first transmit buffer when the frame configuration type is the first configuration type, the device controller is to transmit the first information over the first interconnect that indicates the configuration type information stored at a configuration register of the RE device is to be set to a second configuration type at a future time. The device controller is to determine, based on the future time, when to change the first configuration type at the configuration register to the second configuration type in order to effectuate, at the future time, a change in the number of the frame's antenna samples over which the framer packetizes the streaming data.

In an embodiment, the second value is less than the first value. In an embodiment, the emptiness of the transmit DMA buffer is based upon an amount of transmit data in the transmit DMA buffer. In an embodiment, the DMA controller to configure a second transmit buffer to store streaming data for a second antenna carrier received at the REC device, a third register to store an indicator of an amount of data saved at the second transmit buffer, and a fourth register to store a second empty threshold value, the DMA controller to provide a too empty indicator for the second buffer to the device controller in response to the value of the third register matching a value of the fourth register. In an embodiment, a number of the frame's antenna carrier samples over which the framer is to transmit the second streaming is based upon the configuration type, and where for the first and second frame configuration types, the number of the frame's antenna samples over which the framer is to transmit the streaming data is a third value that can be the same or different than the first value and the second value, and for a third frame configuration type, the number of the frame's antenna samples over which the framer is to transmit data from the second transmit buffer is a fourth value that is different than the third value, and can be the same or different than the first value and the second value. In an embodiment, the emptiness monitoring logic is to further provide a normal fullness indicator for the first transmit buffer to the device controller in response to the first transmit buffer meeting a threshold greater than the value of the second register. In an embodiment, in response to receiving an instance of the normal fullness indicator for the first transmit buffer, the device controller is to transmit second information over the first interconnect that indicates the configuration type information stored at the configuration register of the RE device is to be set to the first configuration type at a future time. In an embodiment, the device controller is to determine, based on the future time, when to change the second configuration type at the third register to the first configuration type in order to effectuate, at the future time, the change in the number of the frame's antenna samples over which the framer is to packetize the streaming data. In an embodiment, the second register is programmable. In an embodiment, a threshold greater than the value stored at the second register is stored at a third register, and is compared to the first register to determine if the normal fullness indicator is to be generated. In an embodiment, the radio equipment control device to further receive streaming data for the plurality of antenna carriers over the first interconnect from the RE device, including streaming data for the first antenna carrier. In an embodiment, the DMA controller is further to configure a first receive buffer to store streaming data received at the REC device, and the DMA controller further includes fullness monitoring logic that includes a third register to store an indicator of an amount of data saved at the first receive buffer, and a fourth register to store a full threshold value, the DMA controller coupled to provide a too full indicator for the first receive buffer to the device controller in response to the value of the third register matching a value of the fourth register. In an embodiment, the radio equipment control system further includes a de-framer to extract from each received frame a number of first antenna carrier samples that is indicated by the frame's configuration type stored at the configuration register. In an embodiment, in response to receiving an instance of the too full indicator for the first receive buffer when the frame configuration type is the first configuration type, the device controller is to transmit the first information over the first interconnect that indicates the configuration type information stored at the configuration register of the RE device is to be set to the second configuration type. In an embodiment, the device controller is to determine when to change the first configuration type at the configuration register to the second configuration type in order to effectuate, at the future time, the change in the number of the frame's antenna samples over which the framer packetizes the streaming data. In an embodiment, an interface link of the first interconnect includes one or more of a common public radio interface (CPRI) and an open base station architecture initiative (OBSAI) interface.

According to another aspect, a method is disclosed in accordance with at least one embodiment of the present disclosure. The method includes determining, at an REC device of a radio base station, that a first receive Direct Memory Access (RDMA) buffer is too full in response to determining that a current amount of data at the RDMA buffer has met a first RDMA full threshold, where the RDMA stores streaming data for a first antenna carrier being transmitted over an interface link to a Radio Equipment device for wireless transmission. The method also includes in response to determining the RDMA buffer is too full, transmitting, from the REC device, a first indicator, for reception by a Radio Equipment (RE) device, that indicates the streaming data will be transmitted by the REC device at a lower data rate at a future time. The method further includes prior to the future time, transmitting, over the interface link, streaming data over first frame instances based on a first configuration, where the first configuration indicates streaming data is being transmitted over a number of antenna carrier samples of each of the first frame instances, and each antenna carrier sample has a first sample width. The method also includes at the future time, transmitting streaming data over second frame instances based on a second configuration, where the second configuration indicates streaming data is being transmitted over the number of antenna carrier samples of each of the second frame instances, and each antenna carrier sample has a second sample width, where a last transmitted instance of the first frame instance is contiguous with a first-in-order instance of the second frame instances, where the second sample width is less than the first sample width.

In an embodiment, a rate at which data is removed from the first RDMA buffer is reduced in response to transmitting the streaming data over the second frame instances as compared to transmitting the streaming data over the first frame instances.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described.

For example, it will be appreciated that the concepts described herein are applicable to any CPRI topology, such as chain of REC devices to a chain of RE devices, and the like. In addition, it will be appreciated that line 101 is bidirectional, therefore various features, other than features unique to the REC as described, that are described unidirectionally can apply bi-directionally.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining, at an REC device of a radio base station, that a first transmit Direct Memory Access (TDMA) buffer is too empty in response to determining that a current amount of data at the TDMA buffer has met a first TDMA empty threshold, wherein the TDMA stores streaming data for a first antenna carrier being transmitted over an interface link to a Radio Equipment device for wireless transmission;
   in response to determining the TDMA buffer is too empty, transmitting, from the REC device, a first indicator, for reception by a Radio Equipment (RE) device, that indicates the streaming data will be transmitted by the REC device at a lower data rate at a future time;
   prior to the future time, transmitting, over the interface link, streaming data over first frame instances based on a first configuration, wherein the first configuration indicates streaming data is being transmitted over a first number of antenna carrier samples of each of the first frame instances; and
   at the future time, transmitting streaming data over second frame instances based on a second configuration, wherein the second configuration indicates streaming data is being transmitted over a second number antenna carrier samples of each of the second frame instances, wherein a last transmitted instance of the first frame instance is contiguous with a first-in-order instance of the second frame instances, wherein the total number of carrier samples is the same for the first and second frame instances.

2. The method of claim 1, wherein a rate at which data is removed from the first TDMA buffer is reduced in response to transmitting the first transmit data over the second frame instances as compared to transmitting the streaming data over the first frame instances.

3. The method of claim 1, wherein the emptiness of the first TDMA buffer is based upon an amount of transmit data in the first TDMA buffer.

4. The method of claim 1, wherein the first configuration further indicates that streaming data of a second antenna carrier being transmitted over the first frame instances are being transmitted over a third number of carrier samples of the frame, wherein the third number can be the same or different than the first and the second number, and the second configuration further indicates that the streaming data is being transmitted over the third number of carrier samples of the frame.

5. The method of claim 1, further comprising:
   determining, after the future time, that the TDMA buffer is no longer too empty;
   in response to determining the TDMA buffer is no longer too empty, transmitting, from the REC device, a second indicator, for reception by the RE device, that indicates that at another future time the first antenna carrier will be transmitted by the REC device over third frame instances based upon the first configuration; and
   at the another future time, begin transmitting streaming data for the first antenna carrier over the third frame instances, wherein a last transmitted instance of the second frame instances is contiguous with a first-in-order instance of the third frame instances.

6. The method of claim 5, wherein the value of the TDMA empty threshold is programmable.

7. The method of claim 6, wherein the value of the TDMA empty threshold and a value of a second TDMA empty threshold value that is used in determining that the TDMA buffer is no longer too empty are different values.

8. The method of claim 4, further comprising:
   determining, at the REC device after the future time while second frame instances are being transmitted, that a receive Direct Memory Access (RDMA) buffer is too full in response to determining that a current amount of data at the RDMA buffer has met a first RDMA full threshold, wherein the RDMA stores streaming data for a second antenna carrier being received from the RE device over a third number of carrier samples second frame instances, wherein the third number can be the same or different than the first and second number;
   in response to determining the RDMA buffer is too full, transmitting, from the REC device, a second indicator, for reception by a Radio Equipment (RE) device, that indicates the streaming data will be transmitted at a lower data rate at another future time; and
   after the another future time, transmitting streaming data over third frame instances based on a third configuration, wherein the third configuration indicates that the third frame instances transmit the streaming data over the second number of antenna carrier samples, and indicates that the third frame instances transmit the streaming data over a fourth number of antenna carrier samples, the fourth number being different than the third number, and the same or different as the first number and the second number.

9. The method of claim 1, wherein the interface link comprises one or more of a common public radio interface (CPRI) and an open base station architecture initiative (OBSAI) interface.

10. A radio equipment control system comprising:
    a radio equipment control (REC) device to transmit packetized streaming data over a first interconnect to a Radio Equipment (RE) device for wireless transmission, including streaming data for a first antenna carrier, the REC device having a device controller, a Direct Memory Access (DMA) controller, a framer, and a configuration register;

the DMA controller to configure a first transmit buffer to store streaming data received at the REC device, and includes an emptiness monitoring logic having a first register to store an indicator of an amount of data saved at the first transmit buffer, and a second register to store a first empty threshold value, the DMA controller coupled to provide a too empty indicator for the first transmit buffer to the device controller in response to the value of the first register matching a value of the second register;

the framer to generate frames of the packetized streaming data, each frame having a total number of antenna carrier samples, a number of antenna carrier samples over which the framer is to transmit data from the first transmit buffer is based upon a frame configuration type that is stored at a configuration register, wherein for a first frame configuration type, the number of the frame's antenna samples over which the framer is to transmit data from the first transmit buffer is a first value, and for a second frame configuration type, the number of the frame's antenna samples over which the framer is to transmit data from the first transmit buffer is a second value; and in response to receiving an instance of the too empty indicator for the first transmit buffer when the frame configuration type is the first configuration type,
the device controller is to transmit the first information over the first interconnect that indicates the configuration type information stored at a configuration register of the RE device is to be set to a second configuration type at a future time, and
the device controller is to determine, based on the future time, when to change the first configuration type at the configuration register to the second configuration type in order to effectuate, at the future time, a change in the number of the frame's antenna samples over which the framer packetizes the streaming data.

11. The REC system of claim 10, wherein, the second value is less than the first value.

12. The REC system of claim 10, wherein the emptiness of the transmit DMA buffer is based upon an amount of transmit data in the transmit DMA buffer.

13. The radio equipment control system of claim 10, wherein:
the DMA controller to configure a second transmit buffer to store streaming data for a second antenna carrier received at the REC device, a third register to store an indicator of an amount of data saved at the second transmit buffer, and a fourth register to store a second empty threshold value, the DMA controller to provide a too empty indicator for the second buffer to the device controller in response to the value of the third register matching a value of the fourth register; and
a number of the frame's antenna carrier samples over which the framer is to transmit the second streaming is based upon the configuration type, and wherein for the first and second frame configuration types, the number of the frame's antenna samples over which the framer is to transmit the streaming data is a third value that can be the same or different than the first value and the second value, and for a third frame configuration type, the number of the frame's antenna samples over which the framer is to transmit data from the second transmit buffer is a fourth value that is different than the third value, and can be the same or different than the first value and the second value.

14. The radio equipment control system of claim 10, wherein:
the emptiness monitoring logic is to further provide a normal fullness indicator for the first transmit buffer to the device controller in response to the first transmit buffer meeting a threshold greater than the value of the second register; and
in response to receiving an instance of the normal fullness indicator for the first transmit buffer,
the device controller is to transmit second information over the first interconnect that indicates the configuration type information stored at the configuration register of the RE device is to be set to the first configuration type at a future time, and
the device controller is to determine, based on the future time, when to change the second configuration type at the third register to the first configuration type in order to effectuate, at the future time, the change in the number of the frame's antenna samples over which the framer is to packetize the streaming data.

15. The radio equipment control system of claim 14, wherein the second register is programmable.

16. The radio equipment control system of claim 14, wherein a threshold greater than the value stored at the second register is stored at a third register, and is compared to the first register to determine if the normal fullness indicator is to be generated.

17. The radio equipment control system of claim 10, wherein:
the REC device to further receive streaming data for the plurality of antenna carriers over the first interconnect from the RE device, including streaming data for the first antenna carrier;
the DMA controller is further to configure a first receive buffer to store streaming data received at the REC device, and the DMA controller further includes fullness monitoring logic that includes a third register to store an indicator of an amount of data saved at the first receive buffer, and a fourth register to store a full threshold value, the DMA controller coupled to provide a too full indicator for the first receive buffer to the device controller in response to the value of the third register matching a value of the fourth register;
a de-framer to extract from each received frame a number of first antenna carrier samples that is indicated by the frame's configuration type stored at the configuration register,
in response to receiving an instance of the too full indicator for the first receive buffer when the frame configuration type is the first configuration type,
the device controller is to transmit the first information over the first interconnect that indicates the configuration type information stored at the configuration register of the RE device is to be set to the second configuration type, and
the device controller is to determine when to change the first configuration type at the configuration register to the second configuration type in order to effectuate, at the future time, the change in the number of the frame's antenna samples over which the framer packetizes the streaming data.

18. The radio equipment control system of claim 10, wherein an interface link of the first interconnect comprises one or more of a common public radio interface (CPRI) and an open base station architecture initiative (OBSAI) interface.

19. A method comprising:

determining, at an REC device of a radio base station, that a first receive Direct Memory Access (RDMA) buffer is too full in response to determining that a current amount of data at the RDMA buffer has met a first RDMA full threshold, wherein the RDMA stores streaming data for a first antenna carrier being transmitted over an interface link to a Radio Equipment device for wireless transmission;

in response to determining the RDMA buffer is too full, transmitting, from the REC device, a first indicator, for reception by a Radio Equipment (RE) device, that indicates the streaming data will be transmitted by the REC device at a lower data rate at a future time;

prior to the future time, transmitting, over the interface link, streaming data over first frame instances based on a first configuration, wherein the first configuration indicates streaming data is being transmitted over a number of antenna carrier samples of each of the first frame instances, and each antenna carrier sample has a first sample width; and at the future time, transmitting streaming data over second frame instances based on a second configuration, wherein the second configuration indicates streaming data is being transmitted over the number of antenna carrier samples of each of the second frame instances, and each antenna carrier sample has a second sample width, wherein a last transmitted instance of the first frame instance is contiguous with a first-in-order instance of the second frame instances, wherein the second sample width is less than the first sample width.

20. The method of claim 19, wherein a rate at which data is removed from the first RDMA buffer is reduced in response to transmitting the streaming data over the second frame instances as compared to transmitting the streaming data over the first frame instances.

* * * * *